(12) United States Patent
Bestler

(10) Patent No.: US 8,271,669 B2
(45) Date of Patent: Sep. 18, 2012

(54) METHOD AND SYSTEM FOR EXTENDED STEERING TAGS (STAGS) TO MINIMIZE MEMORY BANDWIDTH FOR CONTENT DELIVERY SERVERS

(75) Inventor: Caitlin Bestler, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 549 days.

(21) Appl. No.: 11/941,271

(22) Filed: Nov. 16, 2007

(65) Prior Publication Data
US 2008/0301311 A1 Dec. 4, 2008

Related U.S. Application Data

(60) Provisional application No. 60/940,812, filed on May 30, 2007.

(51) Int. Cl.
G06F 15/16 (2006.01)
H04L 12/28 (2006.01)
(52) U.S. Cl. .................................... 709/230; 370/389
(58) Field of Classification Search .......... 719/321; 709/220, 250, 230; 370/389
See application file for complete search history.

(56) References Cited

U.S. PATENT DOCUMENTS

| | | | | |
|---|---|---|---|---|
| 7,012,918 B2* | 3/2006 | Williams | | 370/389 |
| 7,243,284 B2* | 7/2007 | Machulsky et al. | | 714/748 |
| 2002/0118703 A1* | 8/2002 | O'Neill et al. | | 370/474 |
| 2005/0015469 A1* | 1/2005 | Zuberi | | 709/220 |
| 2005/0114455 A1* | 5/2005 | Conroy et al. | | 709/206 |
| 2005/0129045 A1* | 6/2005 | Machulsky et al. | | 370/428 |
| 2005/0132077 A1* | 6/2005 | Biran et al. | | 709/230 |
| 2005/0144310 A1* | 6/2005 | Biran et al. | | 709/234 |
| 2005/0223118 A1* | 10/2005 | Tucker et al. | | 709/250 |
| 2005/0240678 A1* | 10/2005 | Hufferd et al. | | 709/246 |
| 2005/0240941 A1* | 10/2005 | Hufferd et al. | | 719/321 |
| 2006/0013251 A1* | 1/2006 | Hufferd | | 370/466 |
| 2006/0013253 A1* | 1/2006 | Hufferd | | 370/466 |
| 2006/0256784 A1* | 11/2006 | Feng et al. | | 370/381 |
| 2007/0165672 A1* | 7/2007 | Keels et al. | | 370/474 |
| 2007/0208820 A1* | 9/2007 | Makhervaks et al. | | 709/212 |
| 2007/0226386 A1* | 9/2007 | Sharp et al. | | 710/62 |
| 2007/0226750 A1* | 9/2007 | Sharp et al. | | 719/313 |
| 2008/0043750 A1* | 2/2008 | Keels et al. | | 370/395.52 |
| 2008/0273532 A1* | 11/2008 | Bar-David et al. | | 370/392 |

* cited by examiner

Primary Examiner — Firmin Backer
Assistant Examiner — Michael A Chambers
(74) Attorney, Agent, or Firm — Thomas, Kayden, Horstemeyer & Risley, LLP

(57) ABSTRACT

Aspects of a method and system for extended steering tags (STags) to minimize memory bandwidth for content delivery servers are presented. Aspects of the system may include at least one processor that enables reception of at least a portion of a data stripe within a direct data placement (DDP) segment. The one or more processors may enable transfer of a modified version of the received portion of the data stripe to a client without waiting to receive a subsequent portion or more of a data stripe destined for the client. The modified version of the received portion or more of the data stripe may contain a destination location for storing the modified version of the portion or more of the data stripe within the client.

30 Claims, 18 Drawing Sheets

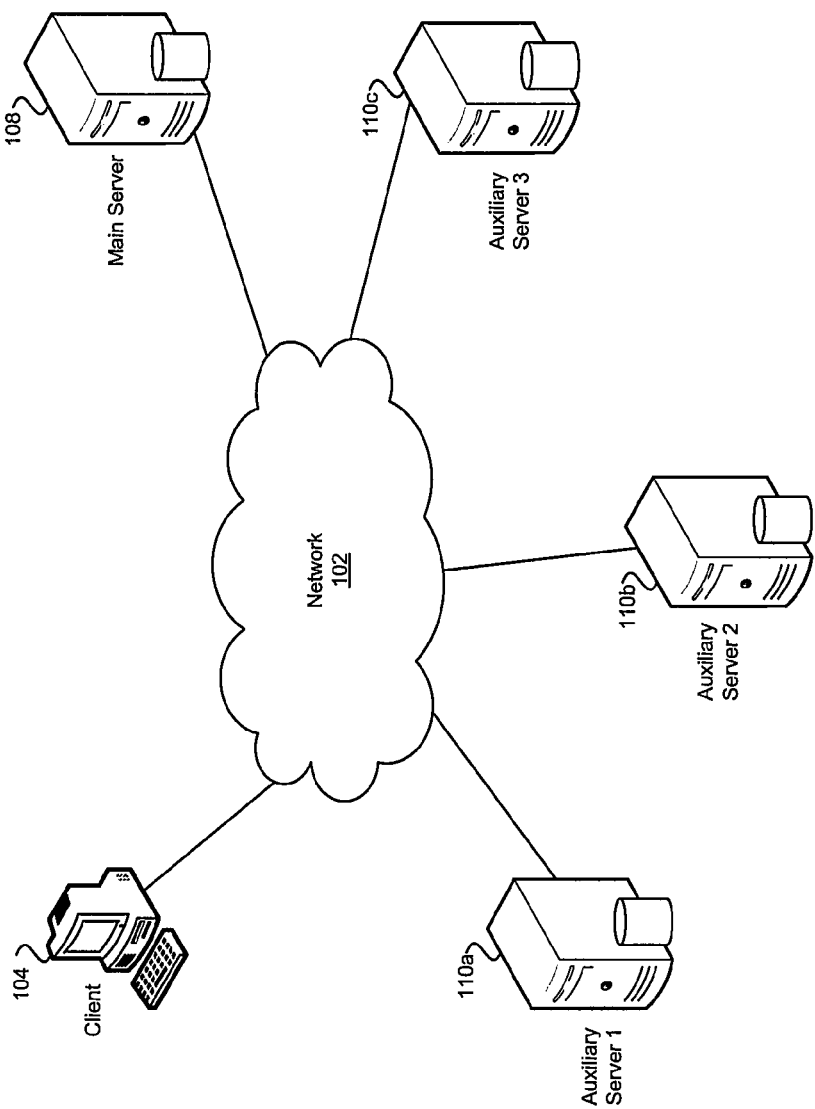

METHOD AND SYSTEM FOR EXTENDED STEERING TAGS (STAGS) TO MINIMIZE MEMORY BANDWIDTH FOR CONTENT DELIVERY SERVERS

CROSS-REFERENCE TO RELATED APPLICATIONS/INCORPORATION BY REFERENCE

This application makes reference to, claims priority to, and claims the benefit of U.S. Provisional Application Ser. No. 60/940,812, filed May 30, 2007, which is hereby incorporated herein by reference in its entirety.

This application makes reference to U.S. application Ser. No. 11/269,422 filed on Nov. 8, 2005, which is hereby incorporated herein by reference.

FIELD OF THE INVENTION

Certain embodiments of the invention relate to data communications. More specifically, certain embodiments of the invention relate to a method and system for extended steering tags (STags) to minimize memory bandwidth for content delivery servers.

BACKGROUND OF THE INVENTION

In conventional computing, a single computer system is often utilized to perform operations on data. The operations may be performed by a single processor, or central processing unit (CPU) within the computer. The operations performed on the data may include numerical calculations, or database access, for example. The CPU may perform the operations under the control of a stored program containing executable code. The code may include a series of instructions that may be executed by the CPU that cause the computer to perform the operations on the data. The capability of a computer in performing these operations may be measured in units of millions of instructions per second (MIPS), or millions of operations per second (MOPS).

Historically, increases in computer performance have depended on improvements in integrated circuit technology, and were often governed by the principles of "Moore's law". Moore's law postulates that the speed of integrated circuit devices may increase at a predictable, and approximately constant, rate over time. However, technology limitations may begin to limit the ability to maintain predictable speed improvements in integrated circuit devices.

Another approach to increasing computer performance implements changes in computer architecture. For example, the introduction of parallel processing may be utilized. In a parallel processing approach, computer systems may utilize a plurality of CPUs within a computer system that may work together to perform operations on data. Parallel processing computers may offer computing performance that may increase as the number of parallel processing CPUs in increased. The size and expense of parallel processing computer systems result in special purpose computer systems. This may limit the range of applications in which the systems may be feasibly or economically utilized.

An alternative to large parallel processing computer systems is cluster computing. In cluster computing, a plurality of smaller computer, connected via a network, may work together to perform operations on data. Cluster computing systems may be implemented, for example, utilizing relatively low cost, general purpose, personal computers or servers. In a cluster computing environment, computers in the cluster may exchange information across a network similar to the way that parallel processing CPUs exchange information across an internal bus. Cluster computing systems may also scale to include networked supercomputers. The collaborative arrangement of computers working cooperatively to perform operations on data may be referred to as high performance computing (HPC).

Cluster computing offers the promise of systems with greatly increased computing performance relative to single processor computers by enabling a plurality of processors distributed across a network to work cooperatively to solve computationally intensive computing problems. One aspect of cooperation between computers may include the sharing of information among computers. Remote direct memory access (RDMA) is a method that enables a processor in a local computer to gain direct access to memory in a remote computer across the network. RDMA may provide improved information transfer performance when compared to traditional communications protocols. RDMA has been deployed in local area network (LAN) environments some of which have been standardized and others which are proprietary. RDMA, when utilized in wide area network (WAN) and Internet environments, is referred to as RDMA over TCP, RDMA over IP, or RDMA over TCP/IP.

In a system utilizing storage area network (SAN) technology, data from a file may be distributed among a plurality of physical and/or logical storage devices, for example. A portion of the file, which is stored in a physical or logical storage device, may be referred to as a "data stripe". A client device, which may be communicatively coupled to an SAN device, may store files and/or data in, or retrieve files and/or data from, the SAN device. An exemplary client device may comprise a personal computer, or workstation. The SAN device may comprise a server device, which may receive files and/or data from the client device, segment the received files and/or data into data stripes, and store each data stripe in at least one of the physical and/or logical storage devices within the SAN device. The server device may also retrieve files and/or data in response to a request from the client device. In this aspect, the server device may retrieve a plurality of data stripes, which may be assembled to reconstitute the retrieved file.

In some conventional SAN systems, the server may retrieve and store each of the retrieved data stripes until the retrieved file has been reconstituted. The reconstituted file may then be transmitted, by the server, to the requesting client device, via a network. One disadvantage in this approach is that the server may be required to allocate physical storage resources, for example memory, which may be utilized to store data stripes until a sufficient number of data stripes have been retrieved to reconstitute the retrieved file.

Another conventional strategy is to retrieve the data stripes sequentially in the nominal order in which it will be delivered to the client device. One limitation of this strategy is that the nominal sequential order may not be the most efficient order for retrieval of the data stripes. For example, a current data stripe may have been stored within the server, but one or more other data stripes may have to be retrieved and delivered to the client device before the current data stripe may be delivered. In such cases, memory locations within the server utilized for storing the current data stripe may be utilized to store one or more of the other data stripe to ensure that the data stripes are delivered to the client device in a determined nominal sequential order.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for extended steering tags (STags) to minimize memory bandwidth for content delivery servers, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 1A illustrates an exemplary system for a storage area network (SAN), which may be utilized in connection with an embodiment of the invention.

DETAILED DESCRIPTION OF THE INVENTION

Figure 1B:
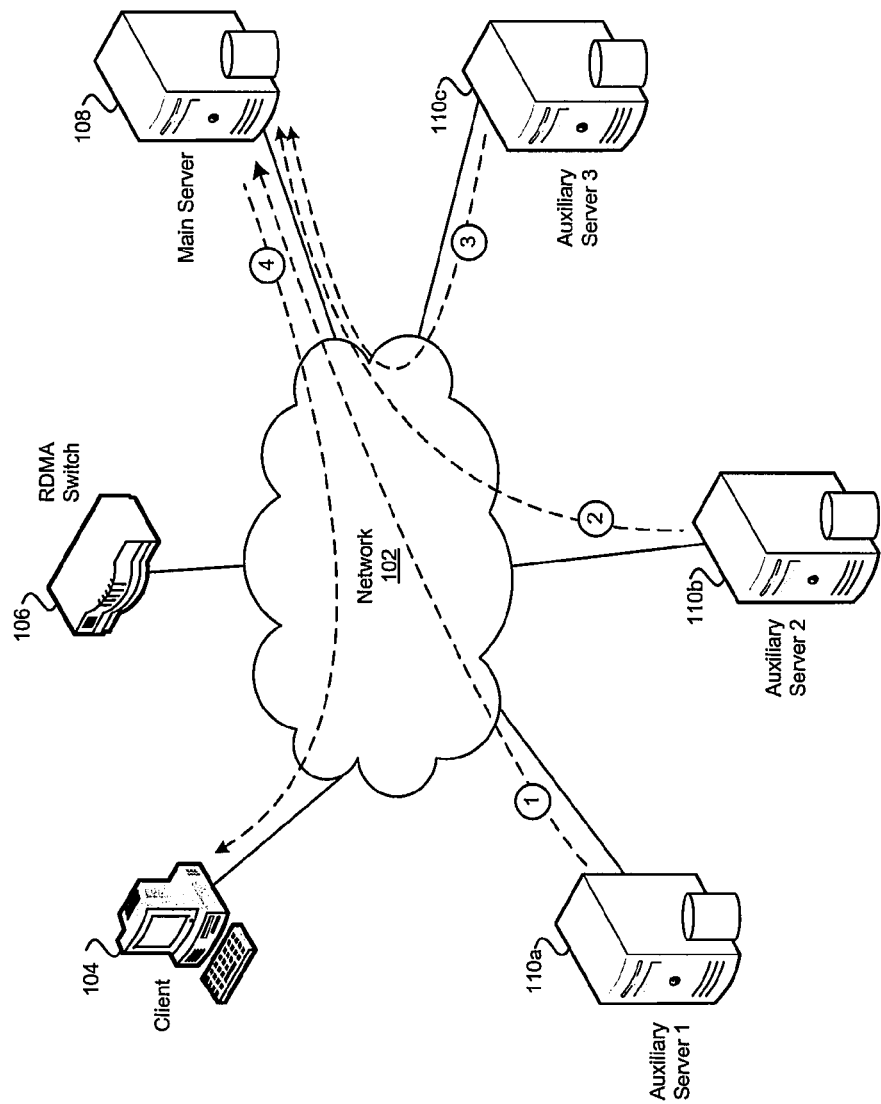
FIG. 1B illustrates exemplary message flows for advertising buffers in an RDMA-aware system, in accordance with an embodiment of the invention.

Certain embodiments of the invention may be found in a method and system for extended steering tags (STags) to minimize memory bandwidth for content delivery servers. Various aspects of the method may comprise splicing tagged direct data placement (DDP) segments received from multiple sources and forwarding of the DDP segments to a client device such that it may appear to the client device that the DDP segments were retrieved from a single source. The DDP segments may be generated in relation to RDMA write operations, and/or RDMA read response operations. For example, a main server may retrieve a plurality of data stripes from a plurality of auxiliary servers while presenting each of the retrieved data stripes to the client device. From the perspective of the client device, it may appear that the data stripes were retrieved from a single source even when the data stripes are retrieved from a plurality of sources. Based on a memory region specification generated by the main server, the main server may generate a modified DDP segment by modifying a header portion of each retrieved DDP segment. Each modified DDP segment may be sent to the client device via the network. At the client device the received DDP segments may appear to have been retrieved from a single source. The client device may utilize the header portion of the received DDP segment, in addition to header portions of subsequently received DDP segments, to assemble the corresponding payload portions of the DDP segments in such a manner to reconstruct a requested file and/or data.

In various embodiments of the invention the main server may serve as a relay point, between the client device and the plurality of auxiliary servers, for retrieving a set of individual data stripes that form the requested file and/or data. In these various embodiments of the invention, the plurality of auxiliary servers may collectively store the set of individual data stripes associated with the requested file and/or data, while the client device may reassemble the requested file and/or data based on receipt of individual data stripes from the set. In this regard, the main server may enable the reassembly of the requested file and/or data from the constituent data stripes without allocating physical storage resources, within the main server, for simultaneous storage of the entire requested file and/or data.

In various embodiments of the invention, the main server may retrieve individual data stripes from the auxiliary servers in an arbitrary order without limitation. At least a portion of a retrieved data stripe may be received from an auxiliary server within a DDP segment. As each DDP segment is received at the main server, the portion of the data stripe contained therein may be sent to the client device without waiting for receipt of a subsequent DDP segment.

FIG. 1A illustrates an exemplary system for a storage area network (SAN), which may be utilized in connection with an embodiment of the invention. Referring to FIG. 1A, there is shown a network 102, a client device 104, main server 108a, and a plurality of auxiliary servers 110a, 110b, and 110c. The client device 104, main server 108, and plurality of auxiliary servers 110a, 110b, and 110c may be communicatively coupled via the network 102. The main server 108, and auxiliary servers 110a, 110b, and 110c may be utilized as components in an SAN device. The client device 104, which may also be referred to as a client, may utilize any of a plurality of upper layer protocols (ULP), for example file sharing protocols, for requesting retrieval and/or storage of files and/or data within the SAN device. Exemplary file sharing protocols may comprise the network file system (NFS), the NetWare core protocol (NCP), the Apple filing protocol (AFP), the common Internet file system (CIFS), server message block (SMB), and Samba. In addition, the client device 104 may utilize the RDMA and/or DDP protocols.

In a system for RDMA, each of the auxiliary servers 110a, 110b, and 110c may advertise buffers to the main server 108. Alternatively, each of buffers within each of the auxiliary servers 110a, 110b, and 110c may be constructed based on instructions received from the main server 108. Each of the buffers may be accessed based on a corresponding steering tag (STag). In an SAN system utilizing data striping, the buffers may be utilized collectively, or in part, to store data stripes associated with a data file. Based on the buffer advertisements, the main server 108 may generate an aggregated STag, Agg_STag, which defines an aggregated memory region. The aggregated memory region, which may be referred to as a physical buffer list (PBL), may represent a logical memory region that is formed by aggregating physical memory regions that were individually defined by buffer advertisements from the auxiliary servers. An individual physical memory region that is a part of the aggregated memory region may be referenced by a physical buffer list entry (PBLE) within the PBL. Each PBLE may be referenced by a page, or block, offset within a virtual address range.

In various embodiments of the invention, an aggregate STag may be translated to comprise a handle that may be utilized by a main server 108 to access a physical buffer advertised by an auxiliary server. The handle may include a connection identifier that describes a method by which the main server 108 may communicate with an auxiliary server 110a, the STag advertised by the auxiliary server 110a for the physical buffer, and a target offset (TO) differential that references a location within the physical buffer.

The PBL may correlate the STags received from individual auxiliary servers to an aggregated STag, Agg_STag. The Agg_STag may be utilized with an aggregated offset value, Agg_TO, to select one of the advertised buffers. The PBL, Agg_STag, and Agg_TO information may be generated by the main server 108. The main server 108 may advertise the Agg_STag and Agg_TO to the client device 104. The source address, for example an IP address, associated with the Agg_STag and Agg_TO advertisement to the client device 104 may be an address that is associated with the main server 108. The client device 104 may subsequently utilize the Agg_STag and Agg_TO information to store data in the advertised buffers and/or to retrieve data from the advertised buffers.

In various embodiments of the invention, the Agg_STag and Agg_TO information may represent logical memory locations within the main server 108, which may not require allocation of physical memory resources for storage of an entire requested data file. The logical memory locations may correspond to an aggregation of a plurality of physical memory resources within a plurality of auxiliary servers 110a, 110b and/or 110c. In this regard, the main server 108 may receive a request from the client device 104 to retrieve the contents stored in a portion of the data resource associated with the advertised Agg_STag, such as contents of a data file. The requested data file may be stored, in a data striping format in which one or more of the plurality of auxiliary servers 110a, 110b, and/or 110c may contain one or more data stripes from the data file. The client device 104 may utilize the Agg_STag and Agg_TO information to reference the storage location or locations of the data file within the logical memory region. The client device 104 may request that the retrieved data file be stored in buffer locations within the client device 104 referenced by a Sink_STag and Sink_TO.

The main server 108 may utilize the PBL for the referenced Agg_STag to locate each of the data stripes contained within the data file. For example, the data file may comprise 3 data stripes: an $STag_1$ may refer to a first data stripe, which may be stored in the auxiliary server 110a, an $STag_2$ may refer to a second data stripe, which may be stored in the auxiliary server 110b, and an $STag_3$ may refer to a third data stripe and may be stored in the auxiliary server 110c. The main server 108 may utilize the PBL to generate the list of STags comprising $STag_1$, $STag_2$, and $STag_3$ based on the Agg_STag. The Agg_STag may be utilized for splicing data stripes 1, 2, and 3 into a single data file. In this regard, the Agg_STag may be referred to as a splitter STag. The main server 108 may utilize the $STag_1$ to retrieve data stripe 1 from the auxiliary server 110a.

Each data stripe may be retrieved from an auxiliary server in one or more tagged DDP segments. Upon retrieval of each DDP segment, the main server 108 may forward a modified version of the tagged DDP segment to the client device 104. A modified version of the tagged DDP segment may be generated by translating an Agg_STag and Agg_TO in a retrieved tagged DDP segment to a corresponding Sink_STag and Sink_TO for the client device 104. The Agg_STag and Agg_TO may reference a logical memory location associated with the main server 108 while the Sink_STag and Sink_TO may reference a physical memory location within the client device 104.

Upon retrieval of the data stripe 1, the main server 108 may transmit the data stripe 1 to the client device 104. The main server 108 may also transmit Sink_STag, and $Sink\_TO_1$ information. The Sink_STag information may be utilized by the client device 104 to identify a buffer to be utilized for storage of the received data stripe 1 within the client device 104. The $Sink\_TO_1$ information may be utilized by the client device 104 to identify a location within the buffer at which the data stripe 1 may be stored.

The main server 108 may utilize the $STag_2$ to retrieve data stripe 2 from the auxiliary server 110b. Upon retrieval of the data stripe 2, the main server 108 may transmit the data stripe 2 to the client device 104. The main server 108 may also transmit Sink_STag, and $Sink\_TO_2$ information. The $Sink\_TO_2$ information may be utilized by the client device 104 to identify a location within the buffer at which the data stripe 2 may be stored.

The main server 108 may utilize the $STag_3$ to retrieve data stripe 3 from the auxiliary server 110c. Upon retrieval of the data stripe 3, the main server 108 may transmit the data stripe 3 to the client device 104. The main server 108 may also transmit Sink_STag, and $Sink\_TO_3$ information. The $Sink\_TO_3$ information may be utilized by the client device 104 to identify a location within the buffer at which the data stripe 3 may be stored.

The buffer offsets $Sink\_TO_1$, $Sink\_TO_2$, and $Sink\_TO_3$ may be utilized by the client device 104 to order the received data stripes 1, 2 and 3 within the buffer referenced by the Sink_STag. For example, the order of arrival of data stripes may be data stripe 2, followed by data stripe 3, followed by data stripe 1, and the client device 104 may still be able to reconstruct the data file by storing each received data stripe at a location within the buffer referenced by the Sink_STag by utilizing the buffer offsets $Sink\_TO_1$, $Sink\_TO_2$, and $Sink\_TO_3$.

In various embodiments of the invention, the responsibility for allocation of physical memory resources for the storage of requested data files may reside in a client device 104 that requested the data file. By comparison, an SAN device, comprising the main server 108, and auxiliary servers 110a, 110b, and 110c for example, may only need to allocate sufficient physical memory resources within the main server 108 for storage of the largest data stripe within a data file, or the largest DDP segment utilized for transporting at least a portion of a data stripe, for example. The ability to reduce requirements for allocation of physical memory resources may enable the SAN device to serve a larger number of client devices before exhausting available physical memory resources.

Various embodiments of the invention may not be limited to SAN systems, or systems that utilize disk storage technologies, such as magnetic and/or optical disk storage. The invention may also be practiced where the physical memory resources reference any of a plurality of storage technologies. For example, various embodiments of the invention may be practiced when the physical memory comprises any of a plurality of storage medium technologies such as volatile memory, for example random access memory (RAM), and/or nonvolatile memory, for example electrically erasable programmable read only memory (EEPROM). In this regard, an Agg_STag and Agg_TO may refer to a physical memory resource within one or more RAM devices, for example.

FIG. 1B illustrates exemplary message flows for advertising buffers in an RDMA-aware system, in accordance with an embodiment of the invention. FIG. 1B shows components that have been previously described in FIG. 1A. Referring to FIG. 1B, there is shown a network 102, a client device 104, a main server 108, and a plurality of auxiliary servers 110a, 110b, and 110c.

The auxiliary server 110a may advertise buffers that may be utilized in an RDMA transaction by communicating the buffer advertisement to the main server 108 as illustrated in the reference label 1. The buffer advertisement may comprise a steering tag $STag_1$, a buffer offset $TO_1$, and a length, $Length_1$. The $STag_1$ may identify a block of physical memory resources within the auxiliary server 110a, which may be utilized for storage and retrieval of files and/or data. The buffer offset $TO_1$ may be utilized to identify a location within the buffer. The length $Length_1$ may be utilized to identify a quantity of physical memory resources, which may be made available within the advertised buffer.

The auxiliary server 110b may advertise buffers that may be utilized in an RDMA transaction by communicating the buffer advertisement to the main server 108 as illustrated in the reference label 2. The buffer advertisement may comprise a steering tag $STag_2$, a buffer offset $TO_2$, and a length, $Length_2$. The $STag_2$ may identify a block of physical memory resources within the auxiliary server 110b, which may be utilized for storage and retrieval of files and/or data. The buffer offset $TO_2$ may be utilized to identify a location within the buffer. The length $Length_2$ may be utilized to identify a quantity of physical memory resources, which may be made available within the advertised buffer.

The auxiliary server 110c may advertise buffers that may be utilized in an RDMA transaction by communicating the buffer advertisement to the main server 108 as illustrated in the reference label 3. The buffer advertisement may comprise a steering tag $STag_3$, a buffer offset $TO_3$, and a length, $Length_3$. The $STag_3$ may identify a block of physical memory resources within the auxiliary server 110c, which may be utilized for storage and retrieval of files and/or data. The buffer offset $TO_3$ may be utilized to identify a location within the buffer. The length $Length_1$ may be utilized to identify a quantity of physical memory resources, which may be advertised in the buffer advertisement.

The main server 108 may receive buffer advertisements as illustrated in reference labels 1, 2, and 3 and compile a physical buffer list (PBL). The PBL may logically group the buffers referenced by the steering tags $STag_1$, $STag_2$, and $STag_3$, respectively, such that an aggregated steering tag $SSTag_{Agg}$ may reference the resulting aggregated buffer. The aggregated buffer may be a logical entity that references physical memory resources identified by the individual steering tags that are represented by PBLEs. The buffer offset $TO_{Agg}$ may identify a location within the aggregated buffer. The length $Length_{Agg}$ may indicate an aggregated quantity of physical memory resources referenced by the aggregated buffer. The aggregated quantity of physical memory resources may be equal to the sum of the individual physical memory resources referenced by each of the PBLEs.

For RDMA transactions that involve storage of files and/or data from the client device 104 to the aggregated buffer, the steering tag $SSTag_{Agg}$ may represent a splitting STag. A splitting STag may be utilized to enable data striping of files and/or data that are to be stored in an SAN device, for example. For RDMA transactions that involve retrieval of files and/or data, which may be stored in a data striping format in an SAN device, for example, the steering tag $SSTag_{Agg}$ may represent a splicing STag. The splicing STag may be utilized to enable individually retrieved data stripes to be ordered such that the files and/or data may be reconstructed from the retrieved data stripes.

The main server 108 may advertise the aggregated buffer that may be utilized in an RDMA transaction by communicating the buffer advertisement as illustrated in the reference label 4. The buffer advertisement may comprise the steering tag $SSTag_{Agg}$, the buffer offset $TO_{Agg}$, and the length, $Length_{Agg}$.

Upon receiving the buffer advertisement as illustrated in the reference label 4, the client device 104 may utilize the steering tag $SSTag_{Agg}$, to perform RDMA transactions on the aggregated buffer. Because the buffer advertisement references the aggregated buffer, the RDMA transactions performed by the client device 104 may not directly access physical memory resources within any of the auxiliary servers 110a, 110b, and/or 110c. Instead, the client device 104 may access logical memory resources within the main server 108. In turn, the main server 108 may translate the reference to logical memory resources to corresponding physical memory resources located within one or more of the auxiliary servers 110a, 110b, and/or 110c. Furthermore, as the main server 108 performs the translations in an RDMA transaction involving a read request from a client device 104, the main server 108 may translate the received read request from the client device 104 to retrieve a current data stripe from one of the auxiliary servers. The main server 108 may then perform a translation before transmitting the retrieved current data stripe to a location within physical memory resources at the client device 104. The main server 108 may retrieve a subsequent data stripe from one of the auxiliary servers. The main server 108 may then perform a translation before transmitting the retrieved subsequent data stripe to a subsequent location within the physical memory resources at the client device 104.

The translations performed on the transmitted data stripes may utilize a steering tag, Sink_STag, and one or more buffer offset values, Sink_TO, to selectively store the current transmitted data stripe, and subsequent transmitted data stripe in locations within the physical memory resources at the client device 104 such that the requested file and/or data may be retrieved from the auxiliary servers 110a, 110b, and/or 110c as data stripes, and transmitted to enable the client device 104 to store the retrieve data stripes in a correct order that enables the client device 104 to reconstruct the requested files and/or data irrespective of the order in which the data stripes are received at the client device 104.

Figure 1C:
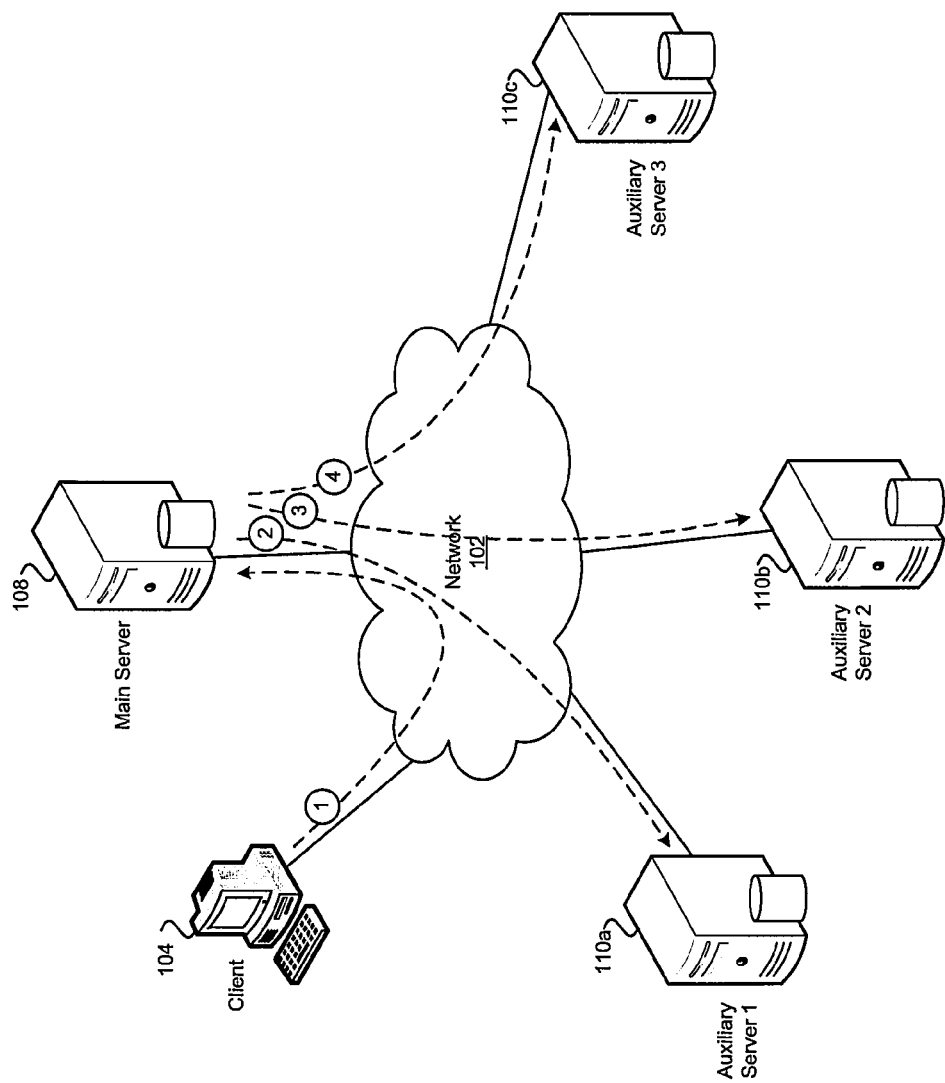
FIG. 1C illustrates exemplary data striping in an RDMA-aware system, in accordance with an embodiment of the invention.

FIG. 1C illustrates exemplary data striping in an RDMA-aware system, in accordance with an embodiment of the invention. FIG. 1C shows components that were previously described in FIG. 1A. Referring to FIG. 1C, there is shown a network 102, a client device 104, a main server 108, and a plurality of auxiliary servers 110a, 110b, and 110c.

The client device 104 may perform an RDMA write operation as illustrated by the reference label 1. The client device 104 may utilize the write operation to request that a file be stored at one or more locations within an SAN device, for example. The locations within the SAN device may be represented by an aggregated buffer, which may be referenced by the client device 104 based on a steering tag, and/or buffer offset. The RDMA write operation may comprise transmission of one or more DDP segments from the client device 104 to the main server 108. Each DDP segment may comprise at least a portion of a file and/or data, which the client device 104 requests to be stored in the SAN device. Each DDP segment may also comprise a reference to the aggregated buffer, which may be utilized for storage of the file, as represented by the $SSTag_{Agg}$, and a location within the aggregated buffer, as represented by the buffer offset $TO_{Agg}$. Each DDP segment may also comprise a signature field, which indicates that the $SSTag_{Agg}$ is a splitting STag.

Upon receipt of a DDP segment from the client device 104, the main server 108 may utilize the splitting STag $SSTag_{Agg}$ to reference a PBL. The PBL may indicate a plurality of steering tags associated with a corresponding plurality of buffers. Each of the buffers may represent physical memory resources located in at least one of a plurality of auxiliary servers 110a, 110b, and/or 110c. The plurality of steering tags may be utilized by the main server 108 to enable data striping of the file received from the client device 104 prior to storage of the data stripes to physical memory resources within at least one of the auxiliary servers 110a, 110b, and/or 110c.

The main server 108 may translate the $SSTag_{Agg}$ and $TO_{Agg}$ in the received DDP segment to generate a modified DDP segment. The modified DDP segment may comprise a steering tag that references a buffer that represents physical memory resources within one of the auxiliary servers, and a buffer offset that indicates a location within the buffer. For example, the modified DDP segment may comprise a steering tag $STag_1$, and buffer offset $TO_1$, which may refer to a physical memory resource location within the auxiliary server 110a. The main server 108 may transmit the modified DDP segment to the auxiliary server 110a by performing an RDMA write operation as illustrated by the reference label 2.

When the RDMA write operation as illustrated in reference label 1 comprises a plurality of DDP segments, the main server 108 may receive a second DDP segment comprising the splitting STag $SSTag_{Agg}$ and a buffer offset $TO'_{Agg}$. The main server 108 may translate the $SSTag_{Agg}$ and $TO'_{Agg}$ in the second received DDP segment to generate a second modified DDP segment. The second modified DDP segment may, for example, comprise a steering tag $STag_2$ and buffer offset $TO_2$, which may refer to a physical memory resource location within the auxiliary server 110b. The main server 108 may transmit the second modified DDP segment to the auxiliary server 110b by performing an RDMA write operation as illustrated by the reference label 3.

During the RDMA write operation, as illustrated in reference label 1, the main server 108 may receive a third DDP segment comprising the splitting STag $SSTag_{Agg}$ and a buffer offset $TO''_{Agg}$. The main server 108 may translate the $SSTag_{Agg}$ and $TO''_{Agg}$ in the third received DDP segment to generate a third modified DDP segment. The third modified DDP segment may, for example, comprise a steering tag $STag_3$ and buffer offset $TO_3$, which may refer to a physical memory resource location within the auxiliary server 110c. The main server 108 may transmit the third modified DDP segment to the auxiliary server 110c by performing an RDMA write operation as illustrated by the reference label 4.

Figure 1D:
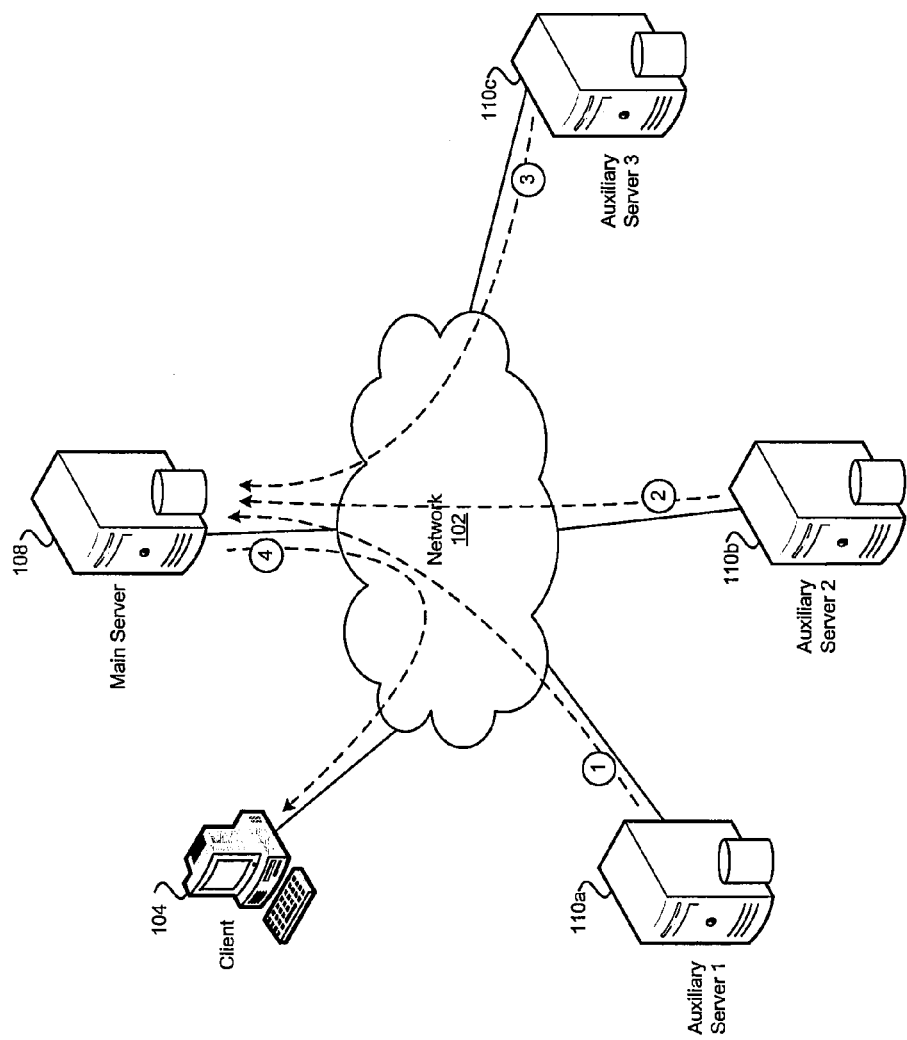
FIG. 1D illustrates exemplary splicing of data stripes in an RDMA-aware system, in accordance with an embodiment of the invention.

FIG. 1D illustrates exemplary splicing of data stripes in an RDMA-aware system, in accordance with an embodiment of the invention. FIG. 1D shows components that were previously described in FIG. 1A. Referring to FIG. 1D, there is shown a network 102, a client device 104, a main server 108, and a plurality of auxiliary servers 110a, 110b, and 110c.

An RDMA read response transaction may occur in response to an RDMA read request, from the client device 104 to the main server 108. The client device 104 may request that the main server 108 retrieve a specified file and/or data. The requested file and/or data may be distributed among a plurality of auxiliary servers 110a, 110b, and/or 110c, in a data striping format, for example. The RDMA read request may comprise transmission of one or more DDP segments from the client device 104 to the main server 108. The RDMA read request may specify a steering tag $SSTag_{Agg}$ that references an aggregated buffer, and a buffer offset $TO_{Agg}$ that references a location within the aggregated buffer. The RDMA read request may also comprise a signature field, which indicates that $SSTag_{Agg}$ is a splicing STag. The aggregated buffer may comprise a logical representation of physical memory resources distributed among a plurality of auxiliary servers 110a, 110b, and/or 110c. The RDMA read request may also specify a steering tag $STag_{Snk}$ and a buffer offset $TO_{Snk}$. The steering tag $STag_{Snk}$ may be utilized to reference physical memory resources, which may be utilized for storage of the requested file at the client device 104. The buffer offset $TO_{Snk}$ may be utilized to reference a location within the client device 104 buffer at which the requested file may be stored.

Upon receipt of the RDMA read request from the client device 104, the main server 108 may utilize the received splicing STag, $SSTag_{Agg}$, as an index into the PBL. The main server 108 may generate a list of steering tags, which reference physical memory resources located in the auxiliary servers 110a, 110b, and/or 110c, which contain at least one data stripe, where each data stripe may contain at least a portion of file requested by the client device 104. For example, the requested file may comprise a data stripe 1 stored in the auxiliary server 110a, a data stripe 2 stored in the auxiliary server 110b, and a data stripe 3 stored in the auxiliary server 110c. The physical memory resources utilized for storage of data stripe 1 may be referenced by a steering tag $STag_1$ and buffer offset $TO_1$. The physical memory resources utilized for storage of data stripe 2 may be referenced by a steering tag $STag_2$ and buffer offset $TO_2$. The physical memory resources utilized for storage of data stripe 3 may be referenced by a steering tag $STag_3$ and buffer offset $TO_3$.

The main server 108 may receive the data stripe 1 from the auxiliary server 1 as illustrated by the reference label 1. The data stripe may be contained in one or more DDP segments. The main server 108 may perform translations on each received DDP segment to generate a modified DDP segment. The modified DDP segment may be forwarded to the client device 104 for storage at a first location within the buffer referenced by the STag$_{Snk}$ steering tag as illustrated by the reference label 4.

The main server 108 may receive the data stripe 2 from the auxiliary server 2 as illustrated by the reference label 2. The data stripe may be contained in one or more DDP segments. The main server 108 may perform translations on each received DDP segment to generate a modified DDP segment. The modified DDP segment may be forwarded to the client device 104 for storage at a second location within the buffer referenced by the STag$_{Snk}$ steering tag as illustrated by the reference label 4.

The main server 108 may receive the data stripe 3 from the auxiliary server 3 as illustrated by the reference label 3. The data stripe may be contained in one or more DDP segments. The main server 108 may perform translations on each received DDP segment to generate a modified DDP segment. The modified DDP segment may be forwarded to the client device 104 for storage at a third location within the buffer referenced by the STag$_{Snk}$ steering tag as illustrated by the reference label 4.

Figure 1E:
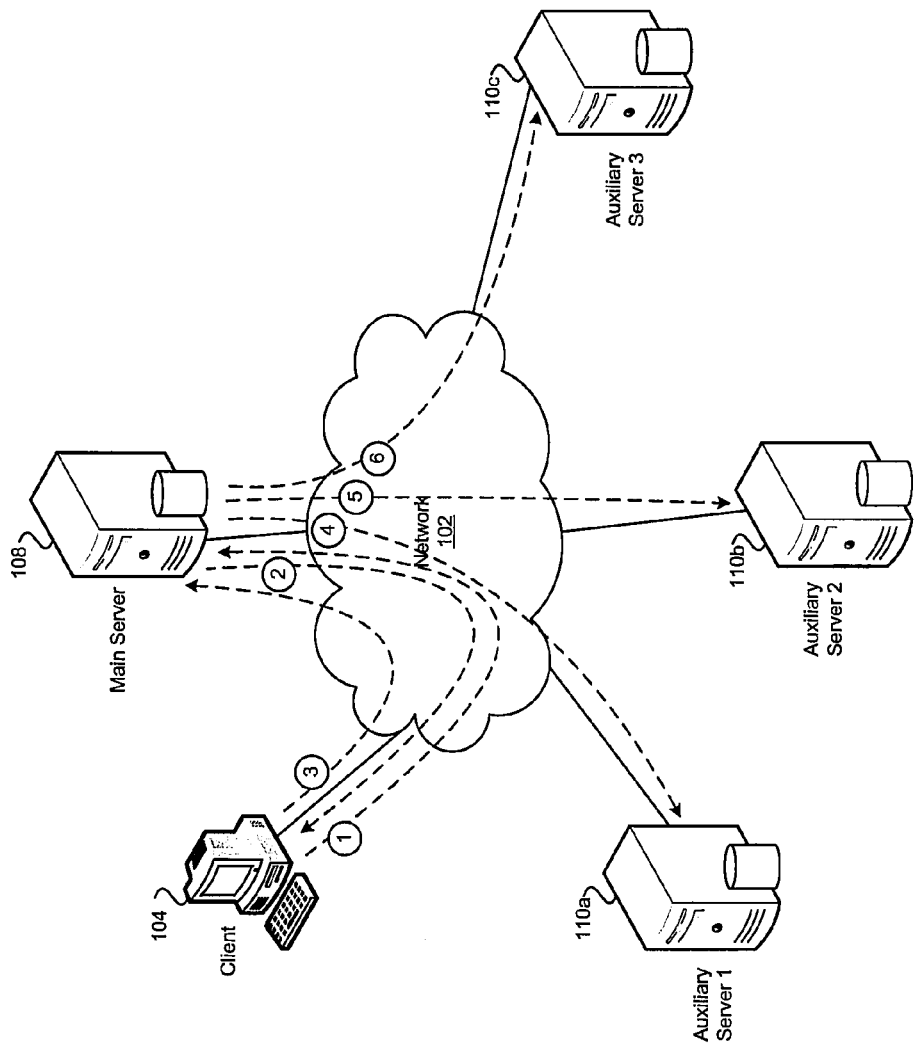
FIG. 1E illustrates exemplary message flows for client prompted data striping in an RDMA-aware system, in accordance with an embodiment of the invention.

FIG. 1E illustrates exemplary message flows for client prompted data striping in an RDMA-aware system, in accordance with an embodiment of the invention. FIG. 1E shows components that were previously described in FIG. 1A. Referring to FIG. 1E, there is shown a network 102, a client device 104, a main server 108, and a plurality of auxiliary servers 110a, 110b, and 110c.

The client device 104 may transmit an advertisement of buffers, which contain files and/or data, to the main server 108 as illustrated by the reference label 1. The buffer advertisement may indicate that the client device 104 requests that the main server 108 retrieve the files and/or data for storage in an SAN device, for example. The main server 108 may construct a physical buffer list (PBL) based on the buffer advertisement. The PBL may comprise a list of physical memory resources, distributed among the auxiliary servers 110a, 110b, and/or 110c, each of which may be utilized to store at least a portion of the files and/or data from the client device 104. The PBL may represent the distributed physical memory resources as an aggregated buffer. The aggregated buffer, which may comprise a logical representation of the distributed physical memory resources, may be referenced in the PBL by a steering tag and buffer offset.

The PBL list may enable the main server 108 to perform data striping on the files and/or data, which the client device 104 requests for storage in an SAN device, for example. The main server 108 may perform an RDMA read request operation to retrieve at least a portion of the files and/or data from the client device 104 as illustrated by the reference label 2. The requested portion of the files and/or data may comprise a first data stripe to be stored in the SAN device, for example. The client device 104 may perform an RDMA read response operation to transmit the requested portion of the files and/or data to the main server 108 as illustrated by the reference label 3. The main server 108 may utilize the PBL to store the first data stripe in the auxiliary server 110a as illustrated by the reference label 4.

The main server 108 may perform another RDMA read request operation to retrieve at least a portion of the files and/or data from the client device 104 as illustrated by the reference label 2. The requested portion of the files and/or data may comprise a second data stripe to be stored in the SAN device, for example. The client device 104 may perform an RDMA read response operation to transmit the requested portion of the files and/or data to the main server 108 as illustrated by the reference label 3. The main server 108 may utilize the PBL to store the second data stripe in the auxiliary server 110b as illustrated by the reference label 5.

The main server 108 may perform another RDMA read request operation to retrieve at least a portion of the files and/or data from the client device 104 as illustrated by the reference label 2. The requested portion of the files and/or data may comprise a third data stripe to be stored in the SAN device, for example. The client device 104 may perform an RDMA read response operation to transmit the requested portion of the files and/or data to the main server 108 as illustrated by the reference label 3. The main server 108 may utilize the PBL to store the second data stripe in the auxiliary server 110c as illustrated by the reference label 6.

In various embodiments of the invention, as illustrated in the preceding exchanges, the client device 104 may not have information about the data striping operation. The client device 104 references logical memory resources as represented by an aggregated buffer. Based on the aggregated buffer steering tag, and corresponding aggregated buffer offset, the main server 108 may translate a reference to the logical memory resources to physical memory resources located at an auxiliary server 110a, 110b, and/or 110c. Furthermore, as is illustrated above, the main server 108 may not allocate physical memory resources to enable storage of an entire file and/or data being received for storage from the client device 104, or being retrieved from the auxiliary servers 110a, 110b, and/or 110c on behalf of the client device 104. The role of the main server 108 may be to present logical memory resources, and provide a method and system, via the PBL for example, for translating references of logical memory resources to physical memory resources that are located within other devices, for example client devices and/or auxiliary servers.

Figure 1F:
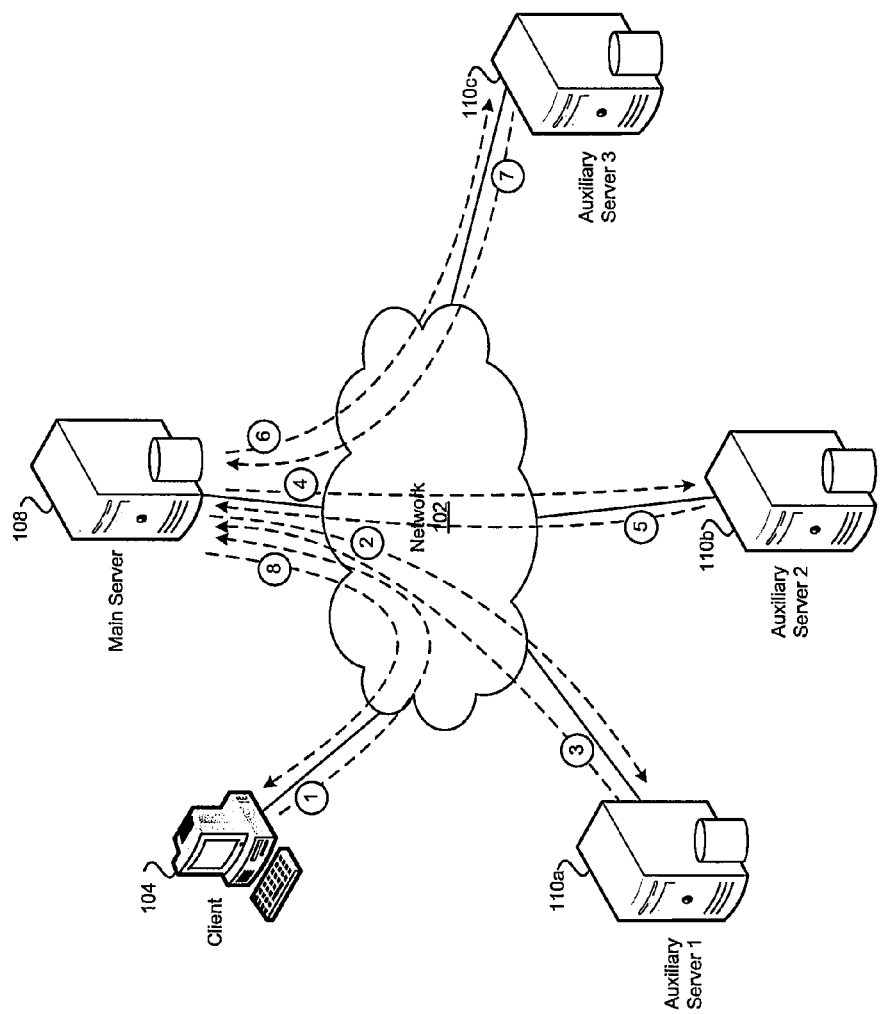
FIG. 1F illustrates exemplary message flows for data splicing in an RDMA-aware system, in accordance with an embodiment of the invention.

FIG. 1F illustrates exemplary message flows for data splicing in an RDMA-aware system, in accordance with an embodiment of the invention. FIG. 1F shows components that were previously described in FIG. 1A. Referring to FIG. 1F, there is shown a network 102, a client device 104, a main server 108, and a plurality of auxiliary servers 110a, 110b, and 110c.

The client device 104 may perform an RDMA read request operation to request that the main server 108 retrieve a file and/or data, as illustrated by the reference label 1. The client device 104 may reference the requested file and/or data based on an aggregated buffer steering tag and an aggregated buffer offset. Based on the aggregated steering tag and aggregated buffer offset, the main server 108 may reference a PBL. The PBL may reference a list of steering tags associated with the aggregated steering tag. Each of the steering tags in the list may reference physical memory resources located in at least one of the auxiliary servers 110a, 110b, and/or 110c.

Based on the list of steering tags generated based on the PBL reference, the main server 108 may identify a corresponding set of data stripes that may contain at least a portion of the file and/or data requested by the client device 104, for example data stripe 1, data stripe 2, and data stripe 3. The main server 108 may perform an RDMA read request operation to request retrieval of the data stripe 1 from the auxiliary server 110a, as illustrated by the reference label 2. The auxiliary server 110a may perform an RDMA read response operation to communicate the requested data stripe 1 to the main server 108, as illustrated by the reference label 3. The auxiliary server 110a may transmit one or more DDP segments when communicating the data stripe 1 to the main server 108. The main server 108 may communicate the data stripe 1 to the client device 104, as illustrated by the reference label 8. When the data stripe 1 is communicated from the auxiliary server 110a to the main server 108 using a plurality of DDP segments, the main server 108 may communicate the portion of the data strip 1 contained in a current DDP segment to the client device 104 without waiting to receive a subsequent DDP segment from the auxiliary server 110a.

The main server 108 may perform an RDMA read request operation to request retrieval of the data stripe 2 from the auxiliary server 110b, as illustrated by the reference label 4. The auxiliary server 110b may perform an RDMA read response operation to communicate the requested data stripe 2 to the main server 108, as illustrated by the reference label 5. The main server 108 may communicate the data stripe 2 to the client device 104, as illustrated by the reference label 8.

The main server 108 may perform an RDMA read request operation to request retrieval of the data stripe 3 from the auxiliary server 110c, as illustrated by the reference label 6. The auxiliary server 110c may perform an RDMA read response operation to communicate the requested data stripe 3 to the main server 108, as illustrated by the reference label 7. The main server 108 may communicate the data stripe 3 to the client device 104, as illustrated by the reference label 8.

Figure 2:
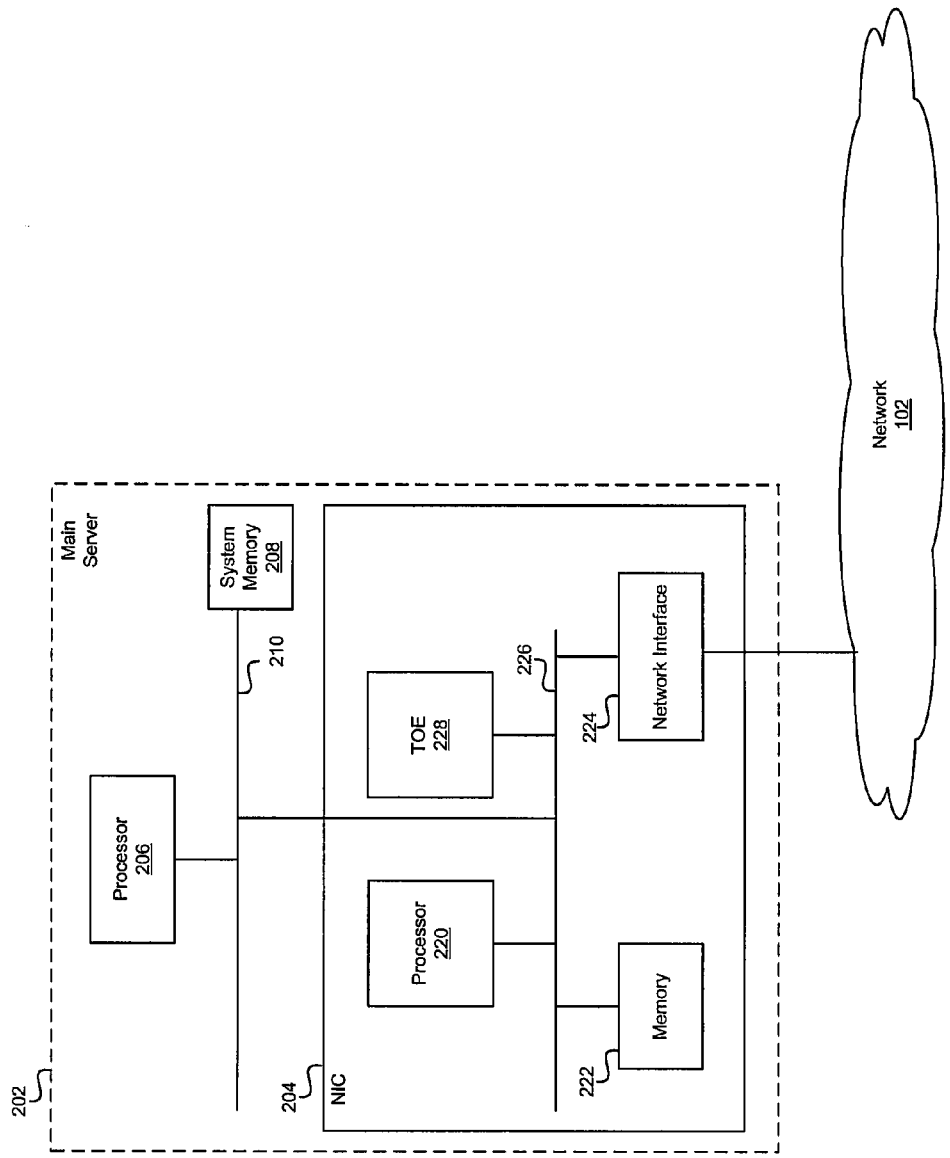
FIG. 2 is a block diagram of an exemplary RDMA-aware system, in accordance with an embodiment of the invention.

FIG. 2 is a block diagram of an exemplary RDMA-aware system, in accordance with an embodiment of the invention. Referring to FIG. 2, there is shown a network 102, and a main server 202. The main server 202 may comprise a network interface controller (NIC) 204, a processor 206, a system memory 208, and a system bus 210. The NIC 204 may comprise a processor 220, a TCP offload engine (TOE) 228, a memory 222, a network interface 224, and a local bus 236.

The processor 206 may comprise suitable logic, circuitry, and/or code that may be utilized to perform upper layer protocol (ULP) functions in connection with RDMA transactions. The processor 206 may be utilized to control the operation of the main server 202 and/or execute ULP code, for example code for NFC, NCP, AFP CIFS SMB, and/or Samba. The processor 206 may be coupled to the system bus 210. The processor 206 may also process untagged DDP segments. The processor 206 may generate PBLs, based on ULP messages, to support RDMA transactions. An exemplary ULP message may comprise a buffer advertisement that was received via the network 102. The processor 206 may also perform ULP processing related to the subsequent utilization of PBLs to support RDMA transactions.

The system memory 208 may comprise suitable logic, circuitry, and/or code that may be utilized to store, or write, and/or retrieve, or read, information, data, and/or executable code. The system memory 208 may comprise a plurality of random access memory (RAM) technologies such as, for example, DRAM, and/or nonvolatile memory, for example electrically erasable programmable read only memory (EEPROM).

The NIC 204 may comprise suitable circuitry, logic and/or code that may enable the main server 202 to transmit and/or receive data from a network, for example, an Ethernet network. The NIC 204 may be coupled to the network 102. The NIC 204 may be coupled to the system bus 210. The NIC 204 may enable the main server 202 to receive DDP segments via the network 102, generate modified DDP segments by performing translation on at least a portion of information contained within the received DDP segment, and subsequently transmit the modified DDP segment via the network 102. The NIC 204 may perform the translation based on information contained in a PBL. The NIC 204 may process a steering tag contained within a DDP segment based on detection of a signature field within the DDP segment. For example, the NIC 204 may translate a steering tag in a received DDP segment based on the detection of the signature field. The NIC 204 may also process a DDP segment based on whether the DDP segment is a tagged DDP segment, or an untagged DDP segment.

The processor 220 may comprise suitable logic, circuitry, and/or code that may be utilized to perform DDP and/or RDMA protocol functions in connection with RDMA transactions as described above. The processor 220 may be coupled to the local bus 226. The local bus 226 may be coupled to the system bus 210.

The TOE 228 may comprise suitable logic, circuitry, and/ or code to perform protocol processing and/or provide reliable transmission and/or reception of DDP segments via the network 102. In various embodiments of the invention, the TOE 228 may utilize a protocol stack that comprises a plurality of protocols, for example TCP and/or IP.

The memory 222 may comprise suitable logic, circuitry, and/or code that may be utilized to store, or write, and/or retrieve, or read, information, data, and/or executable code. The memory 222 may be utilized for temporary storage of DDP segments that are being processed by the NIC 204, or for storage of information contained in a PBL, for example. The memory 222 may comprise a plurality of random access memory (RAM) technologies such as, for example, DRAM, and/or nonvolatile memory, for example electrically erasable programmable read only memory (EEPROM).

The network interface 224 may receive signals via the network 102. The signals may comprise one or more framing information bits indicating the start and/or end of received data. Between the start of the data and the end of the data, the received signals may comprise a representation of bits that are associated with the received data, for example. The received signals may be converted to a binary representation comprising bits based on detected electrical and/or optical signals, with associated timing parameters, signal amplitude, energy, and/or power levels as specified by an appropriate specification for a network medium, for example, Ethernet. The network interface 224 may subsequently transmit bits, for example bits associated with a DDP segment, via the local bus 226.

The network interface 224 may also transmit signals via the network 102. The signals may comprise electrical and/or optical signals that are generated based on binary representations of bits. The bits may be received via the bus 226. The electrical and/or optical signals may be transmitted based on timing parameters, signal amplitudes, energy levels, and/or power levels as specified by an appropriate specification for a network medium.

In operation, the client device 104 may initiate a read request that may be sent in an RDMA message, for example, via the network 102 to the main server 202. The read request may contain a steering SSTag, a buffer offset $TO_{Agg}$, and a signature field that indicates that the SSTag is a splicing STag. The read request may also contain a steering tag Sink_STag, and buffer offset Sink_TO. The splicing SSTag and offset $TO_{Agg}$ may indicate to the main server 202 a location within the logical buffer referenced by SSTag at which the requested file and/or data may be located. The logical buffer may be utilized to generate a PBL, which may identify physical memory resources, located within the auxiliary servers, in which one or more portions of the requested file and/or data may be stored. The steering tag Sink_STag and buffer offset Sink_TO may refer to physical resources within the client device 104 at which the retrieved file and/or data may be stored.

In various embodiments of the invention, the processor 220 may generate the PBL based on the SSTag and/or $TO_{Agg}$. The processor 220 may then utilize the PBL to identify a plurality of referenced splicing STags, which identify physical memory locations within one or more auxiliary servers 110a, 110b and/or 110c. The processor 220 may generate RDMA read requests based on the STags, which may be sent to the appropriate auxiliary servers, to retrieve the corresponding data stripes. The processor 220 may send each RDMA request to the appropriate auxiliary servers to the network interface 224 via the local bus 226. The network interface 224 may then send the received RDMA read requests via the network 102.

The network interface 224 may receive DDP segments sent by the auxiliary servers 110a, 110b and/or 110c in response to the RDMA read requests via the network 102. The network interface 224 may send each DDP segment to the processor 220 via the local bus 226. The processor 220 may utilize data contained within the DDP segment to generate a modified DDP segment. The modified DDP segment may contain the SSTag, a buffer offset $TO_{Agg}$', the Sink_STag, and a buffer offset Sink_TO'. The buffer offset $TO_{Agg}$' may refer to a location within the logical buffer referenced by SSTag, which identifies the location of the DDP segment within the requested file and/or data. The buffer offset Sink_TO' may refer to a location within physical memory resources within the client device 104 at which the data contained in the modified DDP segment may be stored. The processor 220 may send the modified DDP segment to the network interface 224 via the local bus 226. The network interface may send the TCP packet to the client 104 via the network 102.

Thus, in various embodiments of the invention, the processor 220 may utilize the PBL to perform RDMA operations to retrieve data stripes contained in one or more DDP segments received from the auxiliary servers 110a, 110b and/or 110c. The processor 220 may enable the generation of modified DDP segments, which may then be sent to the client device 104. In various embodiments of the invention, the retrieval of DDP segments and generation of modified DDP segments may occur within the NIC 204 without transferring retrieved data via the system bus 210. Thus, bandwidth on the system bus 210 may be made available for other tasks and/or applications executing on the processor 206, for example.

Figure 3A:
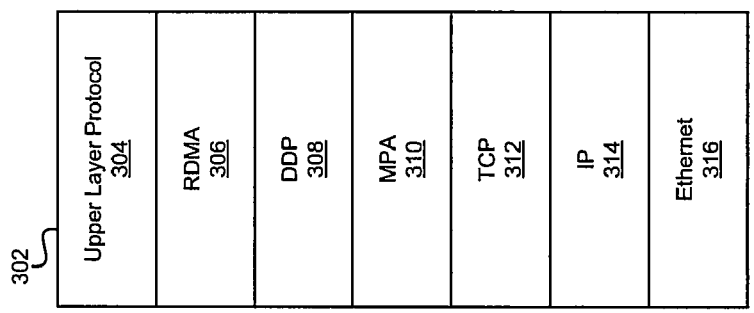
FIG. 3A is an illustration of an exemplary RDMA over TCP protocol stack, which may be utilized in connection with an embodiment of the invention.

FIG. 3A is an illustration of an exemplary RDMA over TCP protocol stack, which may be utilized in connection with an embodiment of the invention. Referring to FIG. 3A, there is shown an RDMA over TCP protocol stack 302. The RDMA over TCP protocol stack 302 may comprise an upper layer protocol (ULP) 304, an RDMA protocol 306, a direct data placement protocol (DDP) 308, a marker-based PDU aligned protocol (MPA) 310, a TCP 312, an IP 314, and an Ethernet protocol 316. In various embodiments of the invention, a client device 104, and/or main server 108 may utilize the RDMA over TCP protocol stack 302 for performing RDMA transactions, via a network 102, in an RDMA-aware system.

The ULP 304 may comprise any of a plurality of protocols, for example file sharing protocols such as the network file system (NFS), the NetWare core protocol (NCP), the Apple filing protocol (AFP), the common Internet file system (CIFS), server message block (SMB), and Samba. The ULP 304 may also perform tasks related to advertisement of buffers, and processing of received advertisements. The ULP may also enable generation of physical buffer lists (PBLs) utilized in connection with RDMA transactions.

The RDMA protocol 306 specifies various methods that may enable a local computer system to exchange information with a remote computer system via a network. The RDMA protocol 306 may be substantially as described in the "An RDMA Protocol Specification" document from the RDMA consortium.

The DDP 308 may enable copy of information from an application user space in a local computer system to an application user space in a remote computer system without performing an intermediate copy of the information to kernel space. This may be referred to as a "zero copy" model. The DDP 308 may be substantially as described in the "Direct Data Placement over Reliable Transports" specification document from the RDMA consortium.

The MPA protocol 310 may comprise methods that enable frames transmitted in an RDMA connection to be transported, via the network 102, via a TCP connection. The MPA protocol 310 may be substantially as described in the "Marker PDU Aligned Framing for TCP Specification" document from the RDMA consortium.

The TCP 312, and IP 314 may comprise methods that enable information to be exchanged via a network according to applicable standards as defined by the Internet Engineering Task Force (IETF). The Ethernet 316 may comprise methods that enable information to be exchanged via a network substantially as described in applicable standards from the IEEE.

Figure 3B:
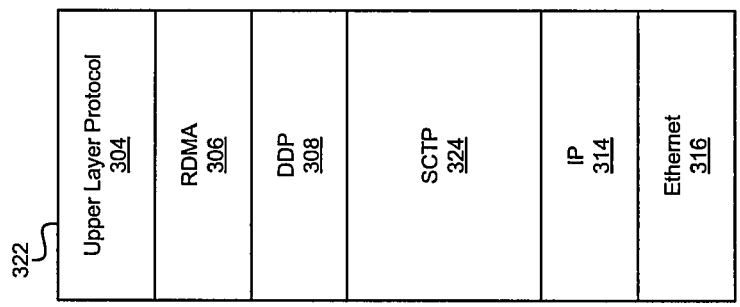
FIG. 3B is an illustration of an exemplary RDMA over SCTP protocol stack, which may be utilized in connection with an embodiment of the invention.

FIG. 3B is an illustration of an exemplary RDMA over SCTP protocol stack, which may be utilized in connection with an embodiment of the invention. Referring to FIG. 3B, there is shown an RDMA over SCTP protocol stack 322. The RDMA over SCTP protocol stack 332 may comprise the upper layer protocol (ULP) 304, the RDMA protocol 306, the direct data placement protocol (DDP) 308, a stream control transmission protocol (SCTP) 324, the IP 314, and the Ethernet protocol 316. In various embodiments of the invention, a client device 104, and/or main server 108 may utilize the RDMA over SCTP protocol stack 322 for performing RDMA transactions, via a network 102, in an RDMA-aware system.

The SCTP 324 may comprise functionality equivalent to the MPA protocol 310 and the TCP 312. In addition, the SCTP 324 may allow a plurality of RDMA connections to utilize a single SCTP association. The SCTP 324 may be substantially as described in request for comments (RFC) 2960, the "Stream Control Transport Protocol" specification document from the IETF.

Figure 3C:
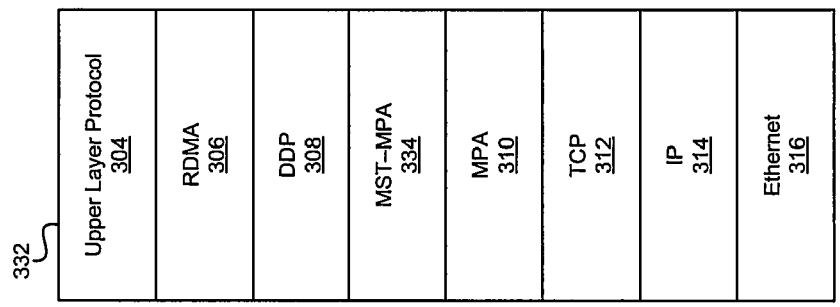
FIG. 3C is an illustration of an exemplary RDMA over TCP protocol stack utilizing MST-MPA, which may be utilized in connection with an embodiment of the invention.

FIG. 3C is an illustration of an exemplary RDMA over TCP protocol stack utilizing MST-MPA, which may be utilized in connection with an embodiment of the invention. Referring to FIG. 3C, there is shown an RDMA over TCP with MST-MPA protocol stack 332. The RDMA over TCP with MST-MPA protocol stack 332 may comprise the upper layer protocol (ULP) 304, the RDMA protocol 306, the direct data placement protocol (DDP) 308, a multi-stream tunneled MPA protocol (MST-MPA) 334, the marker-based PDU aligned protocol (MPA) 310, the TCP 312, the IP 314, and the Ethernet protocol 316. In various embodiments of the invention, a client device 104, and/or main server 108 may utilize the RDMA over TCP with MST-MPA protocol stack 332 for performing RDMA transactions, via a network 102, in an RDMA-aware system.

The MST-MPA 334 may enable a protocol stack utilizing TCP 312 and MPA 310 to realize functionality equivalent to the SCTP 324. The MST-MPA protocol 334 may be substantially as described in paragraphs [104]-[106] in U.S. application Ser. No. 11/269,422, filed on Nov. 8, 2005, and is hereby incorporated herein by reference.

Figure 4A:
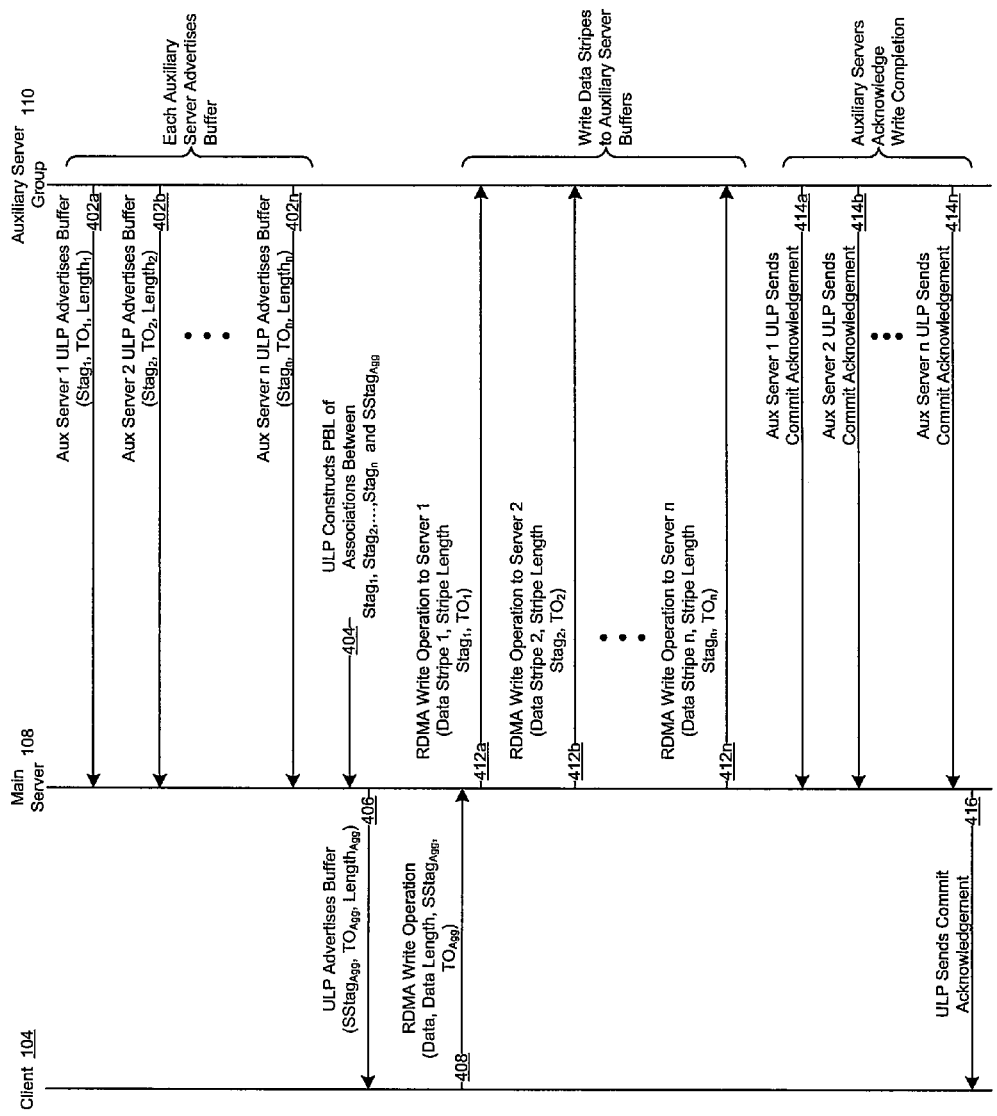
FIG. 4A is a flowchart illustrating exemplary message flows for a client directed RDMA write operation in an RDMA-aware system, in accordance with an embodiment of the invention.

FIG. 4A is a flowchart illustrating exemplary message flows for a client directed RDMA write operation in an RDMA-aware system, in accordance with an embodiment of the invention. FIG. 4A illustrates message exchanges between a client 104, a main server 108, and an auxiliary server group 110. The auxiliary server group may comprise a plurality of auxiliary servers, auxiliary server 110a, auxiliary server 110b, . . . , and auxiliary server n, where n may be a number indicating a number of auxiliary servers in the auxiliary server group, for example auxiliary server 110c when n=3. Each auxiliary server may comprise physical memory resources, which may be utilized for storage and/or retrieval of files and/or data. A storage area network (SAN) device may comprise the auxiliary sever group, and/or the main server 108.

Referring to FIG. 4A, in step 402a, an auxiliary server 110a may advertise a buffer. The buffer advertisement may be contained in a ULP message, which may be sent from the auxiliary server 110a, to the main server 108. The buffer may represent physical memory resources within the auxiliary server 110a, which may be utilized for storage of files and/or data. The ULP message may also comprise a steering tag, $STag_1$, a buffer offset $TO_1$, and a length, $Length_1$. The steering tag $STag_1$ may reference the buffer. The buffer offset, $TO_1$, may be utilized in conjunction with the steering tag, $Stag_1$, to reference a physical memory address within the buffer. The length, $Length_1$, may indicate a quantity of physical memory resources, as measured in bytes for example, that are allocated for the buffer.

In step 402b, an auxiliary server 110b may advertise a buffer, which represents physical memory resources within the auxiliary server 110b. The buffer advertisement may be contained in a ULP message, which may be sent from the auxiliary server 110b, to the main server 108. The ULP message may also comprise a steering tag, $STag_2$, a buffer offset $TO_2$, and a length, $Length_2$.

In step 402n, an auxiliary server n, for example auxiliary server 110c, may advertise a buffer, which represents physical memory resources within the auxiliary server n. The buffer advertisement may be contained in a ULP message, which may be sent from the auxiliary server n, to the main server 108. The ULP message may also comprise a steering tag, $STag_n$, a buffer offset $TO_n$, and a length, $Length_n$.

In step 404, the ULP executing within the main server 108 may construct a physical buffer list (PBL). The main server 108 may utilize the buffer advertisements, received in steps 402a, 402b, . . . , and 402n, to construct an aggregated buffer. The main server 108 may construct a PBL, which associates the individual buffers from the auxiliary server 110a, auxiliary server 110b, . . . , and auxiliary server n, with the aggregated buffer. The aggregated buffer may be associated with an aggregated STag, $SSTag_{Agg}$, an aggregated buffer offset $TO_{Agg}$, and an aggregated length, $Length_{Agg}$. The aggregated buffer may represent logical memory resources, which represent an aggregate of physical memory resources located in the auxiliary server 110a, auxiliary server 110b, . . . , and auxiliary server n. The aggregated STag, $SSTag_{Agg}$, may be associated with the individual steering tags, $STag_1$, $STag_2$, . . . , and $STag_n$. The aggregated length may be represented, $Length_{Agg}=Length_1+Length_2+ . . . +Length_n$.

Based on the value of the aggregated buffer offset, $TO_{Agg}$, an indicated location within the aggregated buffer may reference physical memory resources within the auxiliary server 110a, auxiliary server 110b, . . . , and/or auxiliary server n. For example, for a value $TO_{Agg}=TO_{Agg1}$, the indicated location within the aggregated buffer may reference physical memory resources within the auxiliary server 110a. For a value $TO_{Agg}=TO_{Agg2}$, the indicated location within the aggregated buffer may reference physical memory resources within the auxiliary server 110b, for example. Similarly, for a value $TO_{Agg}=TO_{Aggn}$, the indicated location within the aggregated buffer may reference physical memory resources within the auxiliary server n, for example auxiliary server 110c. The PBL may comprise information, which represents the relationships between the aggregated buffer and each of the buffers that represent physical memory resources.

In step 406, the main server 108 may advertise the aggregated buffer, which represents logical memory resources within the main server 108. The aggregated buffer advertisement may be contained in a ULP message, which may be sent from the main server 108 to the client 104. The ULP message may also comprise the aggregated steering tag, $SSTag_{Agg}$, the aggregated buffer offset $TO_{Agg}$, and the aggregated buffer length, $Length_{Agg}$.

In step 408, the client 104 may perform an RDMA write operation by sending a message to the main server 108. The RDMA write operation may comprise a request from the client to store data in physical memory resources within an SAN device, for example. The message sent by the client to the main server 108 may comprise data, and a data length. The data length may provide an indication of a quantity of data as measured in bytes, for example. The message may also comprise the aggregate steering STag, $SSTag_{Agg}$, and an aggregated buffer offset, $TO_{Agg}$. The message may also comprise a signature field, which indicates that $SSTag_{Agg}$ is a splitting STag.

In steps 412, the main server 108 may utilize the splitting STag as an indication that data striping is to be performed on data received from the client 104. Based on the PBL, the main server 108 may apportion the data received from the client 104 among data stripe 1, data stripe 2, . . . , and data stripe n. The PBL may also comprise a server field that indicates which of the auxiliary servers in the auxiliary server group 110, auxiliary server 110a, auxiliary server 110b, . . . , and auxiliary server n, are to be utilized for storing at least a portion of the data received from the client 104. The main server 108 may utilize the splitting STag to reference the corresponding PBL, and to locate physical memory resources within the auxiliary server 110a, auxiliary server 110b, . . . , and/or auxiliary server n, which may be utilized for storage of at least a portion of the data, in connection with the RDMA write request received from the client 104. In step 412a, the main server 108 may perform an RDMA write operation by sending a message to the auxiliary server 110a. The message sent by the main server 108 to the auxiliary server 1 may comprise the steering tag, $STag_1$, and buffer offset $TO_1$, which may reference physical memory resources within the auxiliary server 1. The message may also comprise the data stripe 1, and a stripe length. The data stripe 1, may comprise a portion of the data sent by the client 104 in connection with the RDMA write operation of step 408. The stripe length may represent a length, as measured in bytes for example, of the data stripe 1.

Upon receipt of the write operation message from the main server 108, the auxiliary server 110a may store the data stripe 1 within physical memory resources at a location indicated by the steering tag, $STag_1$, and the buffer offset $TO_1$. The $STag_1$ value in the message may be made unique from steering tags for buffers on other auxiliary servers based on lower layer information associated with the $STag_1$ value, for example a TCP socket value, or a connection handle.

In step 412b, the main server 108 may perform an RDMA write operation by sending a message to the auxiliary server 110b. The message sent by the main server 108 to the auxiliary server 110b may comprise the steering tag, $STag_2$, and buffer offset $TO_2$, which may reference physical memory resources within the auxiliary server 110b. The message may also comprise a data stripe 2, and a stripe length. The data stripe 2, may comprise a portion of the data sent by the client 104 in connection with the RDMA write operation of step 408. The stripe length may represent a length, as measured in bytes for example, of the data stripe 2. Upon receipt of the write operation message from the main server 108, the auxiliary server 110b may store the data stripe 2 within physical memory resources at a location indicated by the steering tag, $STag_2$, and the buffer offset $TO_2$.

In step 412n, the main server 108 may perform an RDMA write operation by sending a message to the auxiliary server n, for example auxiliary server 110c. The message sent by the main server 108 to the auxiliary server n may comprise the steering tag, $STag_n$, and buffer offset $TO_n$, which may reference physical memory resources within the auxiliary server n. The message may also comprise a data stripe n, and a stripe length. The data stripe n, may comprise a portion of the data sent by the client 104 in connection with the RDMA write operation of step 408. The stripe length may represent a length, as measured in bytes for example, of the data stripe n. Upon receipt of the write operation message from the main server 108, the auxiliary server n may store the data stripe n within physical memory resources at a location indicated by the steering tag, $STag_n$, and the buffer offset $TO_n$.

After storing the data stripe 1, in step 414a, the auxiliary server 110a may send a commit acknowledgement message to the main server 108. The commit acknowledgement message may be contained within a ULP message. The commit acknowledgement message may indicate to the ULP executing within the main server 108 that the data stripe 1 has been successfully stored to physical memory resources within the auxiliary server 110a. The main server 108 may store an indication that the commit acknowledgement message has been received from the auxiliary server 110a.

After storing the data stripe 2, in step 414b, the auxiliary server 110b may send a commit acknowledgement message to the main server 108. The commit acknowledgement message may indicate to the ULP executing within the main server 108 that the data stripe 2 has been successfully stored to physical memory resources within the auxiliary server 110b. The main server 108 may store an indication that the commit acknowledgement message has been received from the auxiliary server 110b.

After storing the data stripe n, in step 414n, the auxiliary server n may send a commit acknowledgement message to the main server 108. The commit acknowledgement message may indicate to the ULP executing within the main server 108 that the data stripe n has been successfully stored to physical memory resources within the auxiliary server n. The main server 108 may store an indication that the commit acknowledgement message has been received from the auxiliary server n.

Based on the PBL, the main server 108 may determine when a commit acknowledgement message has been received from each of the auxiliary servers, utilized for storing at least a portion of the data received from the client 104. When this occurs, in step 416, the main server 108 may send a commit acknowledgement message to the client 104. The commit acknowledgement message may indicate to the ULP executing within the client 104 that the data sent by the client 104 has been stored in physical memory resources within an SAN device, for example.

Figure 4B:
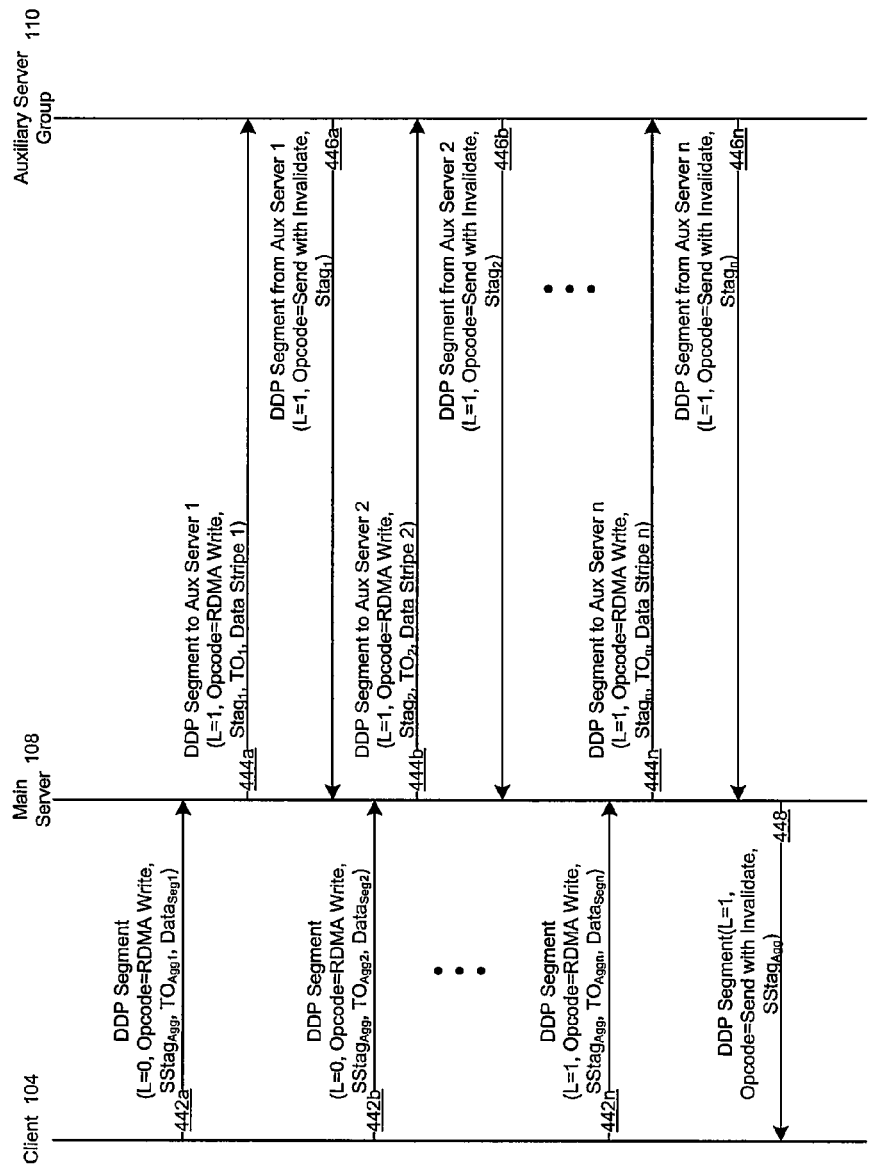
FIG. 4B is a flowchart illustrating exemplary DDP segment exchanges for a client directed RDMA write operation in an RDMA-aware system, in accordance with an embodiment of the invention.

FIG. 4B is a flowchart illustrating exemplary DDP segment exchanges for a client directed RDMA write operation in an RDMA-aware system, in accordance with an embodiment of the invention. FIG. 4B illustrates DDP segment exchanges between a client 104, a main server 108, and an auxiliary server group 110. The write operations illustrated in FIG. 4A may be illustrated in further detail through the associated DDP message exchanges.

Referring to FIG. 4B, steps 442 may represent DDP segments sent in connection with the RDMA write operation of step 406 in FIG. 4A. The data associated with the RDMA write operation of step 406 may be transmitted via one or more DDP segments. In step 442a, the client 104 may send a DDP segment to the main server 108. The DDP segment may comprise a first data segment from the data, $Data_{Seg1}$, which is being sent by the client 104 to the main server 108. The DDP segment may also comprise the splitting STag $SSTag_{Agg}$, and a buffer offset $TO_{Agg1}$. The DDP segment may also comprise the signature field, which indicates that $SSTag_{Agg}$ is a splitting STag. The DDP segment may comprise an operational code (opcode) that indicates that the DDP segment comprises an RDMA write message. The DDP segment may have a last segment indication, L=0, which indicates that the current DDP segment is one of a plurality of DDP segments with at least one subsequent DDP segment to follow.

Upon receipt of the DDP segment, the main server 108 may reference the PBL associated with the splitting tag $SSTag_{Agg}$. Based on the splitting tag and the buffer offset, $TO_{Agg1}$, the main server 108 may determine that the buffer offset references a location within the logical memory resources of the main server 108, which corresponds to a location within the physical memory resources of the auxiliary server 110a. Based on the PBL reference, the main server 108 may translate fields within the received DDP segment to generate a modified DDP segment.

In step 444a, the main server 108 may send the modified DDP segment to the auxiliary server 110a. The main server 108 may translate the field in the received DDP segment in step 442a, comprising the $SSTag_{Agg}$, to comprise the $STag_1$ in the modified DDP segment. The main server 108 may translate the field in the received DDP segment comprising the $TO_{Agg1}$, to comprise $TO_1$ in the modified DDP segment. The $Data_{Seg1}$ in the received DDP segment may become the data stripe 1 in the modified DDP segment. The L=0 in the received DDP segment may be translated to L=1 in the modified DDP segment, which indicates that the modified DDP segment is a last DDP segment transmitted between the main server 108 and the auxiliary server 110a in connection with the received DDP segment in step 442a.

In step 446a, the auxiliary server 110a may send a DDP segment to the main server 108 to acknowledge receipt of the data stripe 1. The acknowledgement may be a DDP segment, which comprises a "send with invalidate" opcode, for example. The DDP segment may also comprise the $STag_1$. The main server 108 may store an indication that the send with invalidate DDP segment has been received from the auxiliary server 110a.

In step 442b, the client 104 may send a DDP segment to the main server 108. The DDP segment may comprise a second data segment from the data, $Data_{Seg2}$. The DDP segment may also comprise the splitting STag $SSTag_{Agg}$, and a buffer offset $TO_{Agg2}$. The DDP segment may comprise an operational code (opcode), which indicates that the DDP segment comprises an RDMA write message. The DDP segment may have a last segment indication, L=0.

Upon receipt of the DDP segment, the main server 108 may reference the PBL associated with the splitting tag $SSTag_{Agg}$. Based on the splitting tag and the buffer offset, $TO_{Agg2}$, the main server 108 may determine that the buffer offset references a location within the logical memory resources of the main server 108, which corresponds to a location within the physical memory resources of the auxiliary server 110b. Based on the PBL reference, the main server 108 may translate fields within the received DDP segment to generate a modified DDP segment.

In step 444b, the main server 108 may send the modified DDP segment to the auxiliary server 110b. The main server 108 may translate the field in the received DDP segment in step 442b, comprising the $SSTag_{Agg}$, to comprise the $STag_2$ in the modified DDP segment. The main server 108 may translate the field in the received DDP segment comprising the $TO_{Agg2}$, to comprise $TO_2$ in the modified DDP segment. The $Data_{Seg2}$ in the received DDP segment may become the data stripe 2 in the modified DDP segment. The L=0 in the received DDP segment may be translated to L=1 in the modified DDP segment in connection with the received DDP segment in step 442b.

In step 446b, the auxiliary server 110b may send a DDP segment to the main server 108 to acknowledge receipt of the data stripe 2. The acknowledgement may be a DDP segment, which comprises a "send with invalidate" opcode, for example. The DDP segment may also comprise the $STag_2$. The main server 108 may store an indication that the send with invalidate DDP segment has been received from the auxiliary server 110b.

In step 442n, the client 104 may send a DDP segment to the main server 108. The DDP segment may comprise an $n^{th}$ data segment from the data, $Data_{Segn}$. The DDP segment may also comprise the splitting STag $SSTag_{Agg}$, and a buffer offset $TO_{Aggn}$. The DDP segment may comprise an operational code (opcode) that indicates that the DDP segment comprises an RDMA write message. The DDP segment may have a last segment indication, L=1.

Upon receipt of the DDP segment, the main server 108 may reference the PBL associated with the splitting tag $SSTag_{Agg}$. Based on the splitting tag and the buffer offset, $TO_{Aggn}$, the main server 108 may determine that the buffer offset references a location within the logical memory resources of the main server 108, which corresponds to a location within the physical memory resources of the auxiliary server n. Based on the PBL reference, the main server 108 may translate fields within the received DDP segment to generate a modified DDP segment.

In step 444n, the main server 108 may send the modified DDP segment to the auxiliary server n. The main server 108 may translate the field in the received DDP segment in step 442n, comprising the $SSTag_{Agg}$, to comprise the $STag_n$ in the modified DDP segment. The main server 108 may translate the field in the received DDP segment comprising the $TO_{Aggn}$, to comprise $TO_n$ in the modified DDP segment. The $Data_{Segn}$ in the received DDP segment may become the data stripe n in the modified DDP segment. The L=1 field in the received DDP segment may be untranslated in the modified DDP segment.

In step 446n, the auxiliary server n may send a DDP segment to the main server 108 to acknowledge receipt of the data stripe n. The acknowledgement may be a DDP segment, which comprises a "send with invalidate" opcode, for example. The DDP segment may also comprise the $STag_n$. The main server 108 may store an indication that the send with invalidate DDP segment has been received from the auxiliary server n.

The main server 108 may reference the server field within the PBL to determine when a send with invalidate DDP segment has been received from each of the auxiliary servers utilized to store at least a portion of the data from the client 104. Based on this determination, in step 448, the main server 108 may send a send a DDP segment to the client 104 to acknowledge receipt of the data. The acknowledgement may be a DDP segment, which comprises a "send with invalidate" opcode, for example. The DDP segment may also comprise the $SSTag_{Agg}$.

Figure 4C:
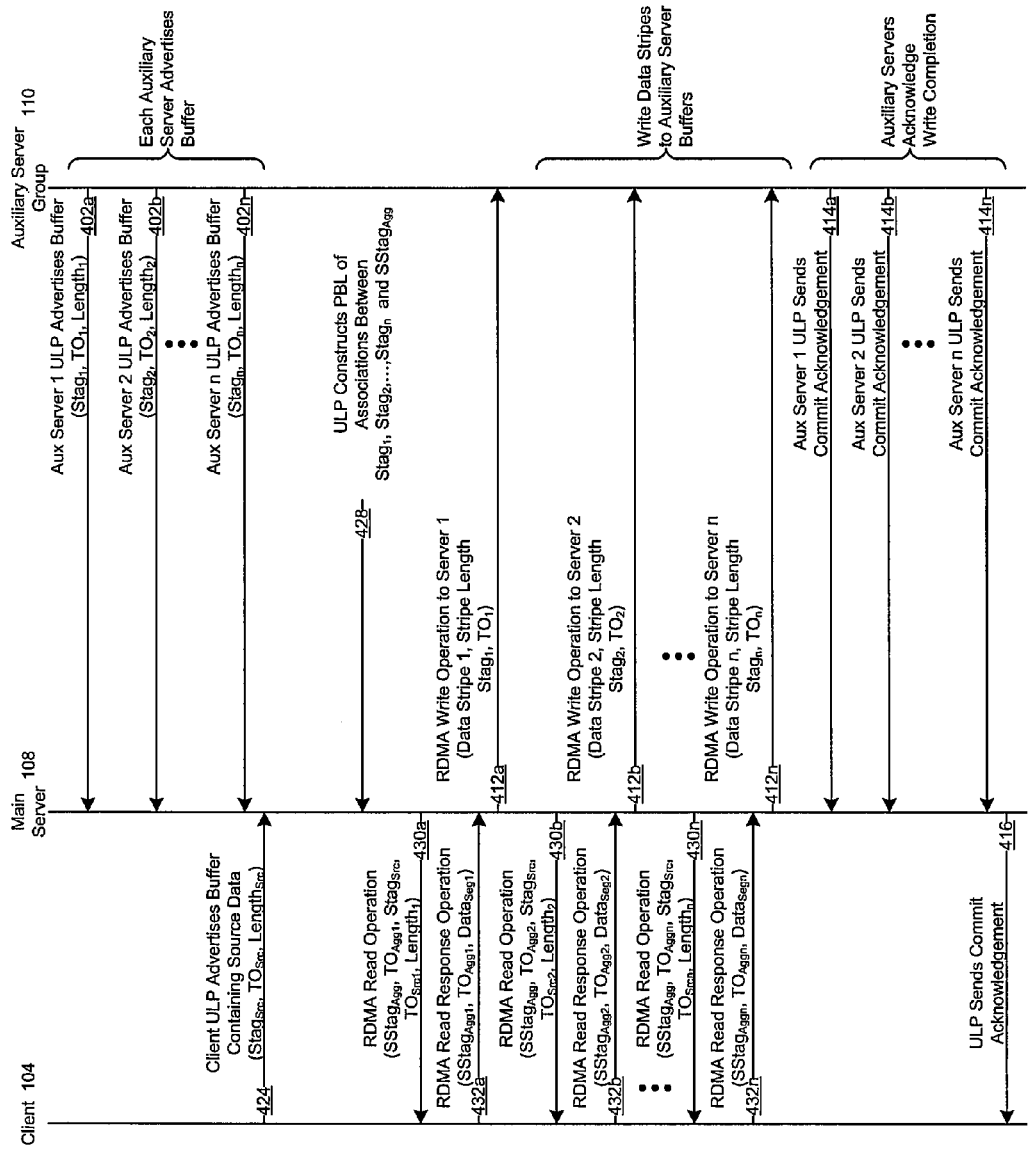
FIG. 4C is a flowchart illustrating exemplary message flows for a client prompted RDMA read operation in an RDMA-aware system, in accordance with an embodiment of the invention.

FIG. 4C is a flowchart illustrating exemplary message flows for a client prompted RDMA read operation in an RDMA-aware system, in accordance with an embodiment of the invention. FIG. 4C illustrates message exchanges between a client 104, a main server 108, and an auxiliary server group 110. The auxiliary server group 110 may comprise a plurality of auxiliary servers, auxiliary server 110a, auxiliary server 110b, . . . , and auxiliary server n. Each auxiliary server may comprise physical memory resources, which may be utilized for storage and/or retrieval of files and/or data. A storage area network (SAN) device may comprise the auxiliary sever group 110, and/or the main server 108. In a client prompted RDMA read operation, the client 104 may not have information about buffers within an SAN device. The client 104 may instead advertise buffers to the SAN device, which contain data that the client 104 requests to be stored within physical memory resources within the SAN device. The buffer advertisement by the client 104 may subsequently prompt the SAN device to retrieve the data from the advertised buffers within the client 104 and store the retrieved data within the SAN device.

Referring to FIG. 4C, in step 402a an auxiliary server 110a may advertise a buffer, as described in FIG. 4A. In step 402b an auxiliary server 110b may advertise a buffer, as described in FIG. 4A. In step 402n an auxiliary server n, for example auxiliary server 110c, may advertise a buffer, as described in FIG. 4A.

In step 424, the client 104 may advertise a buffer, which represents physical memory resources within the client 104. The buffer advertisement may be contained in a ULP message, which is sent from the client 104 to the main server 108. The buffer advertisement may indicate that the advertised buffers contain data that the client requests to be retrieved by the main server 108 and stored within physical memory resources. The ULP message may also comprise a steering tag, $STag_{Src}$, a buffer offset $TO_{Src}$, and a length, $Length_{Src}$. The steering tag, $STag_{Src}$, may reference physical memory resources within the client 104 at which the data is stored. The buffer offset, $TO_{Src}$, may reference a location within the physical memory resources at which the data is stored. The length, $Length_{Src}$, may indicate a quantity of data, as measured in bytes for example, that is stored.

In step 428, the main server 108 may utilize the buffer advertisements received in steps 402a, 402b, . . . , and 402n to construct a physical buffer list (PBL) based on the quantity of client data to be stored as determined from the length, $Length_{Src}$. The PBL may reference an aggregated buffer. The aggregated buffer may be referenced by an aggregated STag, $SSTag_{Agg}$, an aggregated buffer offset $TO_{Agg}$, and an aggregated length, $Length_{Agg}$. The aggregated buffer may represent logical memory resources, which represent physical memory resources located in the auxiliary server 110a, auxiliary server 110b, . . . , and auxiliary server n. The aggregated STag, $SSTag_{Agg}$, may be associated with the individual steering tags, $STag_1$, $STag_2$, . . . , and $STag_n$, received in the buffer advertisements from the auxiliary servers. The aggregated length may be represented, $Length_{Agg} = Length_1 + Length_2 + \ldots + Length_n$. The value of the aggregated length, $Length_{Agg}$, may be equal to or greater than the value of the length $Length_{Src}$. The PBL may comprise information, which represents the relationships between the aggregated buffer and each of the buffers that represent physical memory resources.

In step 430a, the main server 108 may perform an RDMA read operation by sending a message to the client 104. The RDMA read operation may comprise a request that the client 104 send data, located at a specified data source location, to the main server 108. Based on the PBL, the main server 108 may perform data striping by requesting a single data segment in each RDMA read operation. The RDMA read operation in step 430a may request a data segment $Data_{seg1}$.

The message sent by the main server 108 to the client 104 may comprise the data source location from which the $Data_{seg1}$ is to be retrieved, and a data destination location to which the retrieved $Data_{seg1}$ is to be stored. The data destination location for the $Data_{seg1}$ may refer to the aggregated buffer, which may represented by the aggregate steering tag, $SSTag_{Agg}$, and an aggregated buffer offset, $TO_{Agg1}$. The data source location for the $Data_{seg1}$ may refer to the buffer within the client 104, which may be represented by the steering tag, $STag_{Src}$, and a buffer offset, $TO_{Src1}$.

In step 432a, the client 104 may respond to the read operation of step 430a by performing an RDMA read response operation. The RDMA read response may comprise a message sent from the client 104 to the main server 108. The RDMA read response may comprise the data destination information contained in the message received in step 430a, and the requested data segment $Data_{seg1}$.

In step 412a, the main server 108 may perform an RDMA write operation by sending a message to the auxiliary server 110a as described in FIG. 4A. The message sent by the main server 108 to the auxiliary server 110a may comprise the steering tag, $STag_1$, and buffer offset $TO_1$, which may reference physical memory resources within the auxiliary server 110a. The message may also comprise the data stripe 1, and a stripe length. The data stripe 1 may comprise $Data_{seg1}$.

In step 430b, the main server 108 may perform an RDMA read operation by sending a message to the client 104. The RDMA read operation may comprise a request that the client 104 send data segment, $Data_{seg2}$, to the main server 108. The message sent by the main server 108 to the client 104 may comprise the data source location from which the $Data_{seg2}$ is to be retrieved, and a data destination location to which the retrieved $Data_{seg2}$ is to be stored. The data destination location for the $Data_{seg2}$ may refer to the aggregated buffer, which may represented by the aggregate steering tag, $SSTag_{Agg}$, and an aggregated buffer offset, $TO_{Agg2}$. The data source location for the $Data_{seg2}$ may refer to the buffer within the client 104, which may be represented by the steering tag, $STag_{Src}$, and a buffer offset, $TO_{Src2}$.

In step 432b, the client 104 may respond to the read operation of step 430b by performing an RDMA read response operation. The RDMA read response may comprise a message sent from the client 104 to the main server 108. The RDMA read response may comprise the data destination information contained in the message received in step 430b, and the requested data segment $Data_{seg2}$.

In step 412b, the main server 108 may perform an RDMA write operation by sending a message to the auxiliary server 110b as described in FIG. 4A. The message sent by the main server 108 to the auxiliary server 110b may comprise the steering tag, $STag_2$, and buffer offset $TO_2$, which may reference physical memory resources within the auxiliary server 110b. The message may also comprise the data stripe 2, and a stripe length. The data stripe 2 may comprise $Data_{seg2}$.

In step 430n, the main server 108 may perform an RDMA read operation by sending a message to the client 104. The RDMA read operation may comprise a request that the client 104 send data segment, $Data_{segn}$, to the main server 108. The message sent by the main server 108 to the client 104 may comprise the data source location from which the $Data_{segn}$ is to be retrieved, and a data destination location to which the retrieved $Data_{segn}$ is to be stored. The data destination location for the $Data_{segn}$ may refer to the aggregated buffer, which may represented by the aggregate steering tag, $SSTag_{Agg}$, and an aggregated buffer offset, $TO_{Aggn}$. The data source location for the $Data_{segn}$ may refer to the buffer within the client 104, which may be represented by the steering tag, $STag_{Src}$, and a buffer offset, $TO_{Srcn}$.

In step 432n, the client 104 may respond to the read operation of step 430n by performing an RDMA read response operation. The RDMA read response may comprise a message sent from the client 104 to the main server 108. The RDMA read response may comprise the data destination information contained in the message received in step 430n, and the requested data segment $Data_{segn}$.

In step 412n, the main server 108 may perform an RDMA write operation by sending a message to the auxiliary server n as described in FIG. 4A. The message sent by the main server 108 to the auxiliary server n may comprise the steering tag, $STag_n$, and buffer offset $TO_n$, which may reference physical memory resources within the auxiliary server n. The message may also comprise the data stripe n, and a stripe length. The data stripe n may comprise $Data_{segn}$.

After storing the data stripe 1, in step 414a, the auxiliary server 110a may send a commit acknowledgement message to the main server 108, as described in FIG. 4A. After storing the data stripe 2, in step 414b, the auxiliary server 110b may send a commit acknowledgement message to the main server 108, as described in FIG. 4A. After storing the data stripe n, in step 414n, the auxiliary server n, for example auxiliary server 110c, may send a commit acknowledgement message to the main server 108, as described in FIG. 4A. In step 416, the main server 108 may send a commit acknowledgement message to the client, as described in FIG. 4A.

Figure 4D:
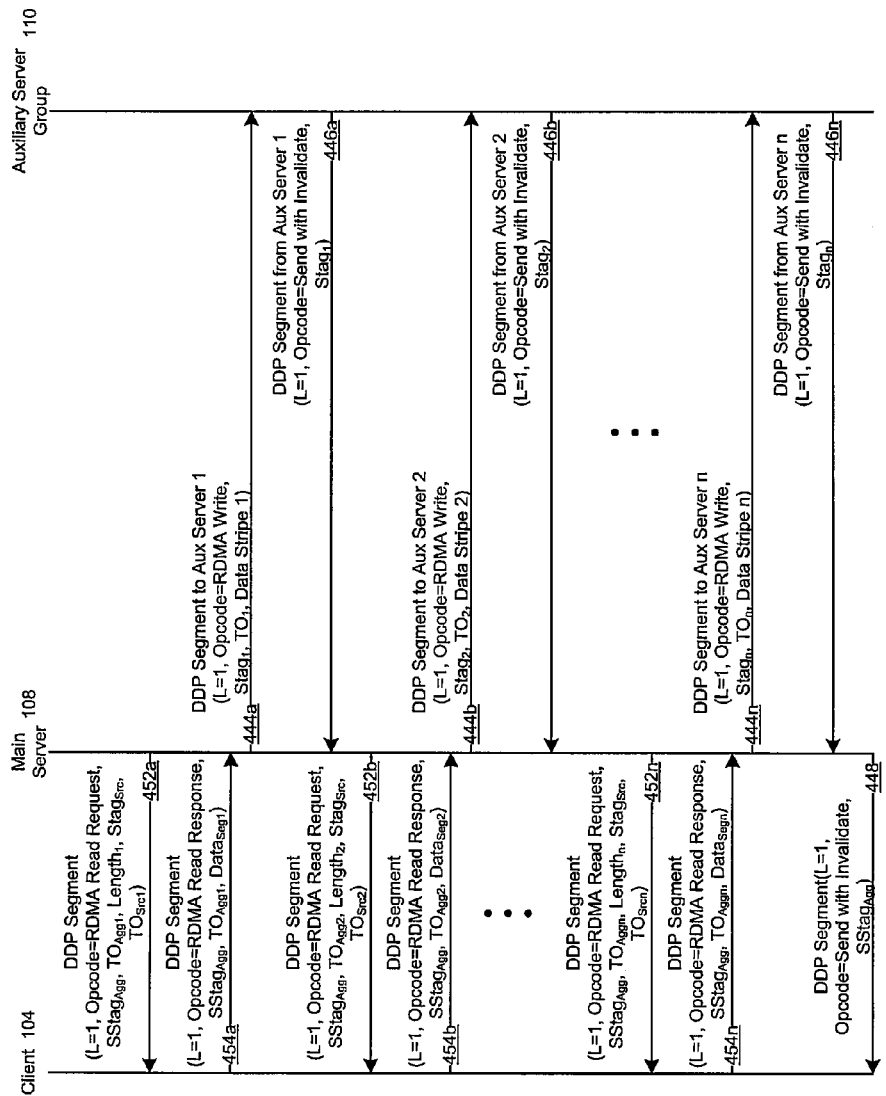
FIG. 4D is a flowchart illustrating exemplary DDP segment exchanges for a client prompted RDMA read operation in an RDMA-aware system, in accordance with an embodiment of the invention.

FIG. 4D is a flowchart illustrating exemplary DDP segment exchanges for a client prompted RDMA read operation in an RDMA-aware system, in accordance with an embodiment of the invention. FIG. 4D illustrates DDP segment exchanges between a client 104, a main server 108, and an auxiliary server group 110. The read operations illustrated in FIG. 4C may be illustrated in further detail through the associated DDP message exchanges.

Referring to FIG. 4D, steps 452 may represent DDP segments sent in connection with the RDMA read operations of steps 430 in FIG. 4C. In step 452a, the main server 108 may send a DDP read request segment to the client 104. The read request segment may request that the client 104 send a first data segment $Data_{Seg1}$ to the main server 108. The DDP segment may comprise the data destination location for $Data_{Seg1}$, as referenced by $SSTag_{Agg}$ and $TO_{Agg1}$, the data source location for $Data_{Seg1}$, as referenced by $STag_{Src}$ and $TO_{Src1}$, and the quantity of data for $Data_{Seg1}$, as indicated by $Length_1$. The DDP segment may comprise an opcode, which indicates that the DDP segment comprises an RDMA read request message.

In step 454a, the client 104 may send a DDP read response segment to the main server 108. The read response segment may comprise the requested $Data_{Seg1}$, and the data destination location for $Data_{Seg1}$, as referenced by $SSTag_{Agg}$ and $TO_{Agg1}$. Upon receipt of the DDP read response segment, the main server 108 may perform translations on the received DDP segment to generate a modified DDP segment.

In step 444a, the main server 108 may send the modified DDP segment to the auxiliary server 110a. The main server 108 may translate the field comprising the $SSTag_{Agg}$ in the received DDP segment to comprise the $STag_1$ in the modified DDP segment. The main server 108 may translate the field comprising the $TO_{Agg1}$ in the received DDP segment to comprise $TO_1$ in the modified DDP segment. The $Data_{Seg1}$ in the received DDP segment may become the data stripe 1 in the modified DDP segment. The modified DDP segment may comprise an opcode, which indicates that the DDP segment comprises an RDMA write message. In step 446a, the auxiliary server 110a may send a DDP segment to the main server 108 to acknowledge receipt of the data stripe 1, as described in FIG. 4B.

In step 452b, the main server 108 may send a DDP read request segment to the client 104. The read request segment may request that the client 104 send a second data segment $Data_{Seg2}$ to the main server 108. The DDP segment may comprise the data destination location for $Data_{Seg2}$, as referenced by $SSTag_{Agg}$ and $TO_{Agg2}$, the data source location for $Data_{Seg2}$, as referenced by $STag_{Src}$ and $TO_{Src2}$, and the quantity of data for $Data_{Seg2}$, as indicated by $Length_2$. The DDP segment may comprise an opcode, which indicates that the DDP segment comprises an RDMA read request message.

In step 454b, the client 104 may send a DDP read response segment to the main server 108. The read response segment may comprise the requested $Data_{Seg2}$, and the data destination location for $Data_{Seg2}$, as referenced by $SSTag_{Agg}$ and $TO_{Agg2}$. Upon receipt of the DDP read response segment, the main server 108 may perform translations on the received DDP segment to generate a modified DDP segment.

In step 444b, the main server 108 may send the modified DDP segment to the auxiliary server 110b. The main server 108 may translate the field comprising the $SSTag_{Agg}$ in the received DDP segment to comprise the $STag_2$ in the modified DDP segment. The main server 108 may translate the field comprising the $TO_{Agg2}$ in the received DDP segment to comprise $TO_2$ in the modified DDP segment. The $Data_{Seg2}$ in the received DDP segment may become the data stripe 2 in the modified DDP segment. The modified DDP segment may comprise an opcode, which indicates that the DDP segment comprises an RDMA write message. In step 446b, the auxiliary server 110b may send a DDP segment to the main server 108 to acknowledge receipt of the data stripe 2, as described in FIG. 4B.

In step 452n, the main server 108 may send a DDP read request segment to the client 104. The read request segment may request that the client 104 send an $n^{th}$ data segment $Data_{Segn}$ to the main server 108. The DDP segment may comprise the data destination location for $Data_{Segn}$, as referenced by $SSTag_{Agg}$ and $TO_{Aggn}$, the data source location for $Data_{Segn}$, as referenced by $STag_{Src}$ and $TO_{Srcn}$, and the quantity of data for $Data_{Segn}$, as indicated by $Length_n$. The DDP segment may comprise an opcode, which indicates that the DDP segment comprises an RDMA read request message.

In step 454n, the client 104 may send a DDP read response segment to the main server 108. The read response segment may comprise the requested $Data_{Segn}$, and the data destination location for $Data_{Segn}$, as referenced by $SSTag_{Agg}$ and $TO_{Aggn}$. Upon receipt of the DDP read response segment, the main server 108 may perform translations on the received DDP segment to generate a modified DDP segment.

In step 444n, the main server 108 may send the modified DDP segment to the auxiliary server n. The main server 108 may translate the field comprising the $SSTag_{Agg}$ in the received DDP segment to comprise the $STag_n$ in the modified DDP segment. The main server 108 may translate the field comprising the $TO_{Aggn}$ in the received DDP segment to comprise $TO_n$ in the modified DDP segment. The $Data_{Segn}$ in the received DDP segment may become the data stripe n in the modified DDP segment. The modified DDP segment may comprise an opcode, which indicates that the DDP segment comprises an RDMA write message. In step 446n, the auxiliary server n may send a DDP segment to the main server 108 to acknowledge receipt of the data stripe n, as described in FIG. 4B. In step 448, the main server 108 may send a DDP segment to acknowledge receipt of the data from the client 104, as described in FIG. 4B.

Figure 5A:
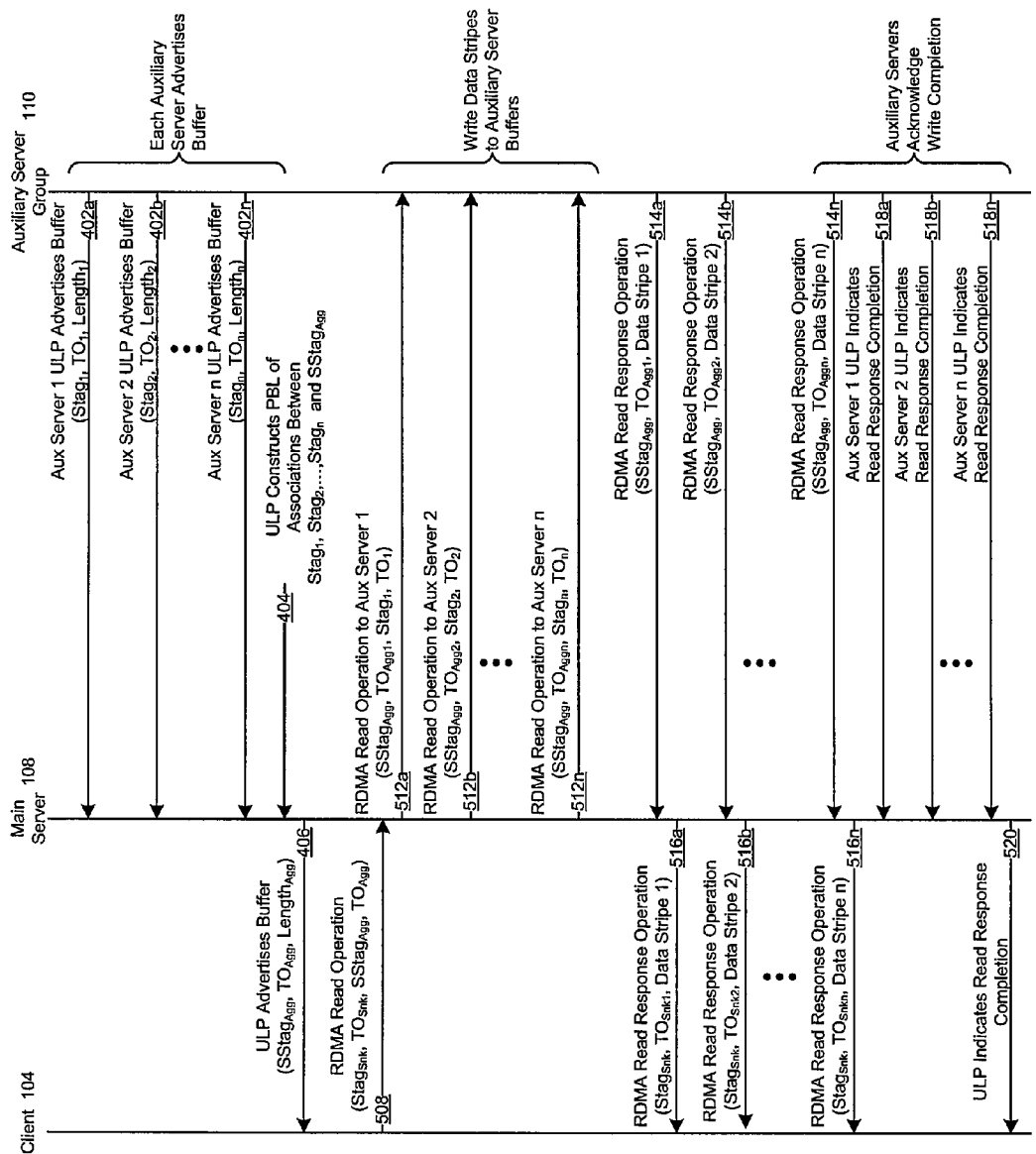
FIG. 5A is a flowchart illustrating exemplary message flows for a client RDMA read operation in an RDMA-aware system, in accordance with an embodiment of the invention.

FIG. 5A is a flowchart illustrating exemplary message flows for a client RDMA read operation in an RDMA-aware system, in accordance with an embodiment of the invention. Referring to FIG. 5A, in step 402a an auxiliary server 110a may advertise a buffer, as described in FIG. 4A. In step 402b an auxiliary server 110b may advertise a buffer, as described in FIG. 4A. In step 402n an auxiliary server n, for example auxiliary server 110c, may advertise a buffer, as described in FIG. 4A. In step 404, the main server 108 may construct a physical buffer list (PBL), as described in FIG. 4A. In step 406, the main server 108 may advertise the aggregated buffer referenced by the PBL, as described in FIG. 4A.

In step 508, the client 104 may perform an RDMA read operation by sending a message to the main server 108. The RDMA read operation may comprise a request from the client to retrieve data stored in physical memory resources within an SAN device, for example. The message sent by the client 104 to the main server 108 may comprise the data source location from which the data is to be retrieved, and a data destination location to which the retrieved data is to be stored. The data destination location for the data may refer to a buffer within the client 104, which may represented by a steering tag, $STag_{Snk}$, and a buffer offset, $TO_{Snk}$. The data source location for the data may refer to the aggregated buffer within the main server 108, which may be represented by an aggregated STag, $SSTag_{Agg}$, and a buffer offset, $TO_{Agg}$. The RDMA read request may also comprise a signature field, which indicates that the $SSTag_{Agg}$ is a splicing STag.

Upon receipt of the RDMA read request, the main server 108 may utilize the splicing STag to reference a PBL. The main server 108 may translate the PBL reference to logical memory resources associated with the aggregated buffer, to reference physical memory resources located in one or more of the auxiliary servers, which may be utilized to store one or more data stripes, which comprise at least a portion of the data requested from the client 104.

In steps 512, the main server 108 may utilize the splicing STag to initiate a plurality of RDMA read operations to retrieve individual data stripes from the auxiliary server group 110. In step 512a, the main server 108 may perform an RDMA read operation by sending a message to the auxiliary server 110a. The message sent by the main server 108 to the auxiliary server 110a may comprise the data source location from which the data stripe 1 is to be retrieved, and a data destination location to which the retrieved data stripe 1 is to be stored. The data destination location for the data may refer to a buffer within the aggregated buffer, which may represented by the splicing STag, $SSTag_{Agg}$, and a buffer offset, $TO_{Agg1}$. The data source location for the data may refer to the buffer within the auxiliary server 110a, which may be represented by $STag_1$, and buffer offset, $TO_1$.

In step 512b, the main server 108 may perform an RDMA read operation by sending a message to the auxiliary server 110b. The message sent by the main server 108 to the auxiliary server 110b may comprise the data source location from which the data stripe 2 is to be retrieved, and a data destination location to which the retrieved data stripe 2 is to be stored. The data destination location for the data may refer to a buffer within the aggregated buffer, which may represented by the splicing STag, $SSTag_{Agg}$, and a buffer offset, $TO_{Agg2}$. The data source location for the data may refer to the buffer within the auxiliary server 110b, which may be represented by $STag_2$, and buffer offset, $TO_2$.

In step 512n, the main server 108 may perform an RDMA read operation by sending a message to the auxiliary server n, for example auxiliary server 110c. The message sent by the main server 108 to the auxiliary server n may comprise the data source location from which the data stripe n is to be retrieved, and a data destination location to which the retrieved data stripe n is to be stored. The data destination location for the data may refer to a buffer within the aggregated buffer, which may represented by the splicing STag, $SSTag_{Agg}$, and a buffer offset, $TO_{Aggn}$. The data source location for the data may refer to the buffer within the auxiliary server n, which may be represented by $STag_n$, and buffer offset, $TO_n$.

Upon receipt of the read operation message from the main server 108 in step 512a, the auxiliary server 110a may retrieve the data stripe 1 from physical memory resources at a location indicated by the steering tag, $STag_1$, and the buffer offset $TO_1$. In step 514a, the auxiliary server 110a may perform an RDMA read response operation by sending a message to the main server 108. The message sent by the auxiliary server 110a to the main server 108 may comprise the data stripe 1, and the data destination location information received in step 512a.

Upon receipt of the read response operation from the auxiliary server 110a, the main server 108 may reference the PBL, based on the $SSTag_{Agg}$, and $TO_{Agg1}$. The main server 108 may utilize the PBL reference to translate the location for logical memory resources within the aggregated buffer, to reference a location for physical memory resources within the client 104. In step 516a, the main server 108 may perform a read response operation by sending a message to the client 104. The message sent by the main server 108 to the client 104 may comprise the data stripe 1, and the data destination location within the client 104 for storage of the data stripe 1, which may represented by the STag $STag_{Snk}$, and the buffer offset, $TO_{Snk1}$.

In step 518a, the auxiliary server 110a may send a read response completion message subsequent to the read response operation of step 514a. The read response completion message may be contained in a ULP message sent from the auxiliary server 110a to the main server 108. The read response operation of step 514a may also provide a read response completion indication. The read response completion message may indicate to the main server 108 that the auxiliary server 110a has completed retrieval of the requested data stripe 1. The main server 108 may store an indication that the read response completion message has been received from the auxiliary server 110a.

Upon receipt of the read operation message from the main server 108 in step 512b, the auxiliary server 110b may retrieve the data stripe 2 from physical memory resources at a location indicated by the steering tag, $STag_2$, and the buffer offset $TO_2$. In step 514b, the auxiliary server 110b may perform an RDMA read response operation by sending a message to the main server 108. The message sent by the auxiliary server 110b to the main server 108 may comprise the data stripe 2, and the data destination location information received in step 512b.

Upon receipt of the read response operation from the auxiliary server 110b, the main server 108 may reference the PBL, based on the $SSTag_{Agg}$, and $TO_{Agg2}$. The main server 108 may utilize the PBL reference to translate the location for logical memory resources within the aggregated buffer, to reference a location for physical memory resources within the client 104. In step 516b, the main server 108 may perform a read response operation by sending a message to the client 104. The message sent by the main server 108 to the client 104 may comprise the data stripe 2, and the data destination location within the client for storage of the data stripe 2, which may represented by the STag $STag_{Snk}$, and the buffer offset, $TO_{Snk2}$.

In step 518b, the auxiliary server 110b may send a read response completion message subsequent to the read response operation of step 514b. The read response completion message may be contained in a ULP message sent from the auxiliary server 110b to the main server 108. The read response operation of step 514b may also provide a read response completion indication. The read response completion message may indicate to the main server 108 that the auxiliary server 110b has completed retrieval of the requested data stripe 2. The main server 108 may store an indication that the read response completion message has been received from the auxiliary server 110b.

Upon receipt of the read operation message from the main server 108 in step 512n, the auxiliary server n, for example auxiliary server 110c, may retrieve the data stripe n from physical memory resources at a location indicated by the steering tag, $STag_n$, and the buffer offset $TO_n$. In step 514n, the auxiliary server n may perform an RDMA read response operation by sending a message to the main server 108. The message sent by the auxiliary server n to the main server 108 may comprise the data stripe n, and the data destination location information received in step 512n.

Upon receipt of the read response operation from the auxiliary server n, the main server 108 may reference the PBL, based on the $SSTag_{Agg}$, and $TO_{Aggn}$. The main server 108 may utilize the PBL reference to translate the location for logical memory resources within the aggregated buffer, to reference a location for physical memory resources within the client 104. In step 516n, the main server 108 may perform a read response operation by sending a message to the client 104. The message sent by the main server 108 to the client 104 may comprise the data stripe n, and the data destination location within the client 104 for storage of the data stripe n, which may be represented by the STag $STag_{Snk}$, and the buffer offset, $TO_{Snkn}$.

In step 518n, the auxiliary server n may send a read response completion message subsequent to the read response operation of step 514n. The read response completion message may be contained in a ULP message sent from the auxiliary server n to the main server 108. The read response operation of step 514n may also provide a read response completion indication. The read response completion message may indicate to the main server 108 that the auxiliary server n has completed retrieval of the requested data stripe n. The main server 108 may store an indication that the read response completion message has been received from the auxiliary server n.

The PBL may comprise information that enables the main server 108 to determine when a read response completion message has been received from each of the auxiliary servers, utilized for retrieving at least a portion of the data requested by the client 104. In step 520, the main server 108 may send a read response completion message to the client 104 when a read response completion message and/or indication has been received from each of the auxiliary servers. The read response completion message may indicate to the ULP within the client 104 that the data retrieval has been completed.

Figure 5B:
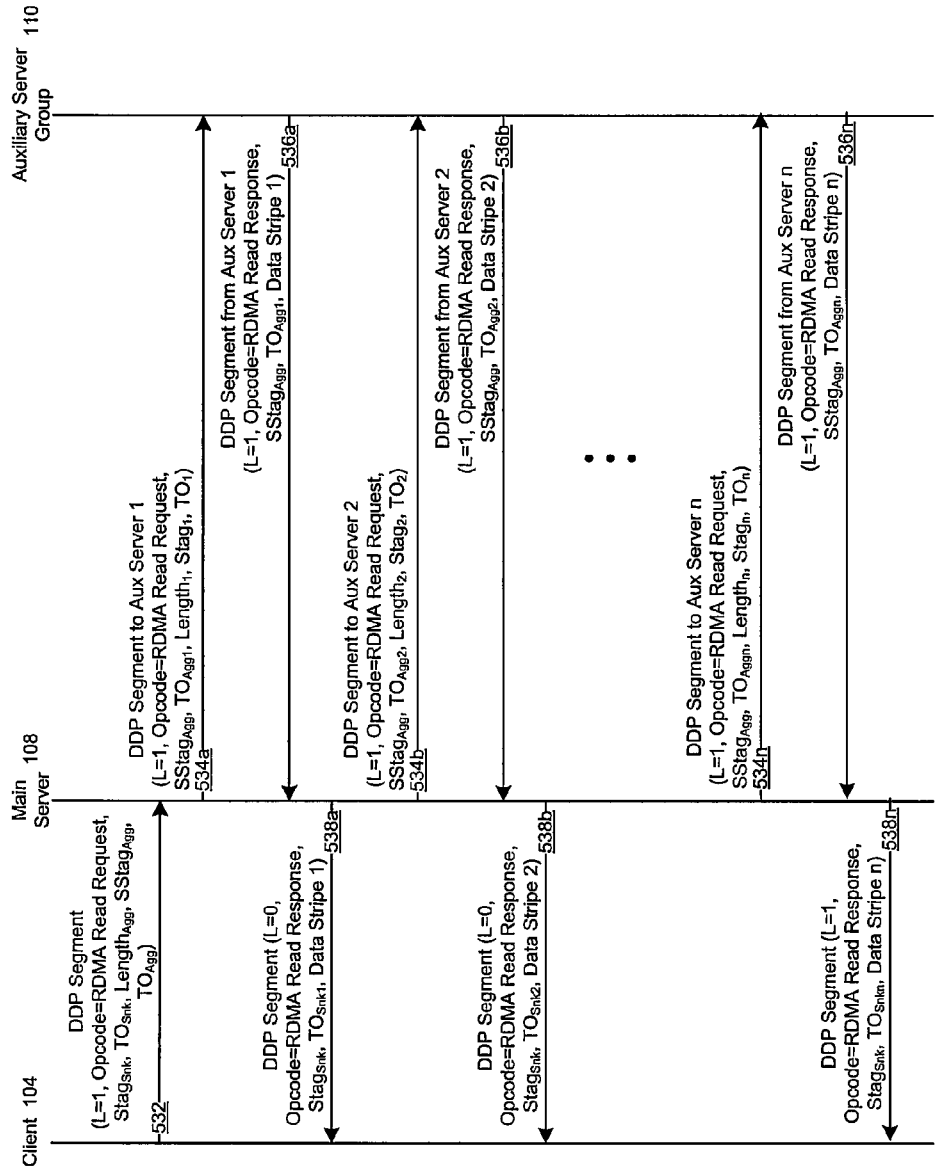
FIG. 5B is a flowchart illustrating exemplary DDP segment exchanges for a client RDMA read operation in an RDMA-aware system, in accordance with an embodiment of the invention.

FIG. 5B is a flowchart illustrating exemplary DDP segment exchanges for a client RDMA read operation in an RDMA-aware system, in accordance with an embodiment of the invention. FIG. 5B illustrates DDP segment exchanges between a client 104, a main server 108, and an auxiliary server group 110. The write operations illustrated in FIG. 5A may be illustrated in further detail through the associated DDP message exchanges.

Referring to FIG. 5B, in step 532, the client 104 may send a DDP segment to the main server 108 to request retrieval of a file. The DDP segment may comprise the STag, which identifies the destination buffer for the retrieved file, $STag_{Snk}$, the destination buffer offset, $TO_{Snk}$, the splicing STag, $SSTag_{Agg}$, the buffer offset, $TO_{Agg}$, and an indication of the quantity of data to be retrieved, $Length_{Agg}$. The DDP segment may comprise an opcode that indicates that the DDP segment comprises an RDMA read request message. The DDP segment may also comprise a signature field, which identifies the $SSTag_{Agg}$ as a splicing STag.

Upon receipt of the DDP segment, the main server 108 may reference the PBL associated with the splicing tag $SSTag_{Agg}$. Based on the PBL reference, the main server 108 may retrieve a plurality of STags, $STag_1$, $STag_2$, ..., and $STag_n$, which may be associated with the splicing STag, $SSTag_{Agg}$. Each of the STags may reference a location wherein a data stripe, which contains a portion of the data for the requested file, may be stored within the auxiliary server group 110. The main server 108 may translate fields within the received DDP segment to generate one or more modified DDP segments. Each of the modified DDP segments may comprise a request to retrieve a data stripe, which comprises at least a portion of the data requested by the client 104.

In step 534a, the main server 108 may send a modified DDP segment to retrieve a data stripe 1 from the auxiliary server 110a. In the modified DDP segment, the data source location may refer to physical memory resources within the auxiliary server 110a, and the data destination location may refer to logical memory resources within the main server 108. The main server 108 may translate the field comprising the $SSTag_{Agg}$ in the received DDP segment to comprise the $STag_1$ in the modified DDP segment. The main server 108 may translate the field comprising the $STag_{Snk}$ in the received DDP segment to comprise the $SSTag_{Agg}$ in the modified DDP segment. The main server 108 may translate the field comprising the $TO_{Agg}$ in the received DDP segment to comprise $TO_1$ in the modified DDP segment. The main server 108 may translate the field comprising the $TO_{Snk}$ in the received DDP segment to comprise the $TO_{Agg1}$ in the modified DDP segment. The main server 108 may translate the field comprising the $Length_{Agg}$ in the received DDP segment to comprise a length value $Length_1$ in the modified DDP segment. The length, $Length_1$, may represent a quantity of data contained in the data stripe 1.

In step 536a, the auxiliary server 110a may send a DDP read response segment to the main server 108. The DDP segment may comprise an opcode that indicates that the DDP segment comprises an RDMA read response message. The read response segment may comprise the requested data stripe 1, and the data destination location for data stripe 1, as referenced by $SSTag_{Agg}$ and $TO_{Agg1}$. The DDP segment may comprise a last segment indication, L=1, which indicates that the current DDP segment is a last DDP segment to be transmitted between the auxiliary server 110a and the main server 108.

Upon receipt of the DDP read response segment in step 536a, the main server 108 may perform translations on the received DDP segment to generate a modified DDP segment. The main server 108 may translate the field comprising the $SSTag_{Agg}$ in the received DDP segment to comprise the $STag_{Snk}$ in the modified DDP segment. The main server 108 may translate the field comprising the $TO_{Agg1}$ in the received DDP segment to comprise $TO_{Snk1}$ in the modified DDP segment. The L=1 field in the received DDP segment may be translated to L=0 in the modified DDP segment to indicate that the current modified DDP segment is one of a plurality of modified DDP segments with at least one subsequent modified DDP segment to follow.

In step 538a, the main server 108 may send the modified DDP segment to the client 104. The read response segment may comprise the requested data stripe 1, and the data destination location for data stripe 1, as referenced by $STag_{Snk}$ and $TO_{Snk1}$. Upon receipt of the DDP segment, the client 104 may store the data stripe 1 at a location within physical memory resources as referenced by the buffer location identified by $STag_{Snk}$ and $TO_{Snk1}$.

In step 534b, the main server 108 may send a modified DDP segment to retrieve a data stripe 2 from the auxiliary server 110b. The modified DDP segment may be a second modified DDP segment generated based on the DDP segment received from the client 104 in step 532. In the second modified DDP segment, the data source location may refer to physical memory resources within the auxiliary server 110b, and the data destination location may refer to logical memory resources within the main server 108. The main server 108 may translate the field comprising the $SSTag_{Agg}$ in the DDP segment received in step 532 to comprise the $STag_2$ in the second modified DDP segment. The main server 108 may translate the field comprising the $STag_{Snk}$ in the received DDP segment to comprise the $SSTag_{Agg}$ in the modified DDP segment. The main server 108 may translate the field comprising the $TO_{Agg}$ in the received DDP segment to comprise $TO_2$ in the modified DDP segment. The main server 108 may translate the field comprising the $TO_{Snk}$ in the received DDP segment to comprise the $TO_{Agg2}$ in the modified DDP segment. The main server 108 may translate the field comprising the $Length_{Agg}$ in the received DDP segment to comprise a length value $Length_2$ in the modified DDP segment. The length, $Length_2$, may represent a quantity of data contained in the data stripe 2.

In step 536b, the auxiliary server 110b may send a DDP read response segment to the main server 108. The received DDP segment may be a second received DDP segment in connection with the DDP segment received in step 532. The DDP segment may comprise an opcode that indicates that the DDP segment comprises an RDMA read response message. The read response segment may comprise the requested data stripe 2, and the data destination location for data stripe 2, as referenced by $SSTag_{Agg}$ and $TO_{Agg2}$. The DDP segment may comprise a last segment indication, L=1, which indicates that the current DDP segment is a last DDP segment to be transmitted between the auxiliary server 110b and the main server 108.

Upon receipt of the DDP read response segment in step 536b, the main server 108 may perform translations on the received DDP segment to generate a second modified DDP segment. The main server 108 may translate the field comprising the $SSTag_{Agg}$ in the received DDP segment to comprise the $STag_{Snk}$ in the modified DDP segment. The main server 108 may translate the field comprising the $TO_{Agg2}$ in the received DDP segment to comprise $TO_{Snk2}$ in the modified DDP segment. The L=1 field in the received DDP segment may be translated to L=0 in the modified DDP segment to indicate that the current modified DDP segment is one of a plurality of modified DDP segments with at least one subsequent modified DDP segment to follow.

In step 538b, the main server 108 may send the second modified DDP segment to the client 104. The read response segment may comprise the requested data stripe 2, and the data destination location for data stripe 2, as referenced by $STag_{Snk}$ and $TO_{Snk2}$. Upon receipt of the DDP segment, the client 104 may store the data stripe 2 at a location within physical memory resources as referenced by the buffer location identified by $STag_{Snk}$ and $TO_{Snk2}$.

In step 534n, the main server 108 may send a DDP segment to retrieve a data stripe n from the auxiliary server n, for example auxiliary server 110c. The DDP segment may be an $n^{th}$ modified DDP segment generated based on the DDP segment received from the client 104 in step 532. In the $n^{th}$ modified DDP segment, the data source location may refer to physical memory resources within the auxiliary server n, and the data destination location may refer to logical memory resources within the main server 108. The main server 108 may translate the field comprising the $SSTag_{Agg}$ in the DDP segment received in step 532 to comprise the $STag_n$ in the $n^{th}$ modified DDP segment. The main server 108 may translate the field comprising the $STag_{Snk}$ in the received DDP segment to comprise the $SSTag_{Agg}$ in the modified DDP segment. The main server 108 may translate the field comprising the $TO_{Agg}$ in the received DDP segment to comprise $TO_n$ in the modified DDP segment. The main server 108 may translate the field comprising the $TO_{Snk}$ in the received DDP segment to comprise the $TO_{Aggn}$ in the modified DDP segment. The main server 108 may translate the field comprising the $Length_{Agg}$ in the received DDP segment to comprise a length value $Length_n$ in the modified DDP segment. The length, $Length_n$, may represent a quantity of data contained in the data stripe n.

In step 536n, the auxiliary server n, for example auxiliary server 110c, may send a DDP read response segment to the main server 108. The received DDP segment may be an $n^{th}$ received DDP segment in connection with the DDP segment received in step 532. The DDP segment may comprise an opcode that indicates that the DDP segment comprises an RDMA read response message. The read response segment may comprise the requested data stripe n, and the data destination location for data stripe n, as referenced by $SSTag_{Agg}$ and $TO_{Aggn}$. The DDP segment may comprise a last segment indication, L=1, which indicates that the current DDP segment is a last DDP segment to be transmitted between the auxiliary server n and the main server 108.

Upon receipt of the DDP read response segment in step 536n, the main server 108 may perform translations on the received DDP segment to generate an $n^{th}$ modified DDP segment. The main server 108 may translate the field comprising the $SSTag_{Agg}$ in the received DDP segment to comprise the $STag_{Snk}$ in the modified DDP segment. The main server 108 may translate the field comprising the $TO_{Aggn}$ in the received DDP segment to comprise $TO_{Snkn}$ in the modified DDP segment. The modified DDP segment may comprise a field L=1, which indicates that the current modified DDP segment is the last modified DDP segment for a read request response in connection with the read request DDP segment received in step 532.

In step 538b, the main server 108 may send the $n^{th}$ modified DDP segment to the client 104. The read response segment may comprise the requested data stripe n, and the data destination location for data stripe n, as referenced by $STag_{Snk}$ and $TO_{Snkn}$. Upon receipt of the DDP segment, the client 104 may store the data stripe n at a location within physical memory resources as referenced by the buffer location identified by $STag_{Snk}$ and $TO_{Snkn}$.

In various embodiments of the invention, an auxiliary server may send a data stripe to the main server 108 in a read response that comprises a plurality of DDP segments. Each of the DDP segments may comprise a portion of the data contained within the data stripe. When the main server 108 receives one of the plurality of DDP segments, a corresponding modified DDP segment may be generated and sent to the client 104 without waiting for a subsequent DDP segment in the plurality of DDP segments to be received. Within each modified DDP segment, the L field may comprise a value L=0 for each DDP segment, regardless of the value for the L field in the corresponding DDP segment received from an auxiliary server, with the exception of the last modified DDP segment sent to the client corresponding to the last read request response DDP segment from an auxiliary server in connection with the read request DDP segment received in step 532. In this last modified DDP segment the L field may comprise a value L=1.

Figure 6:
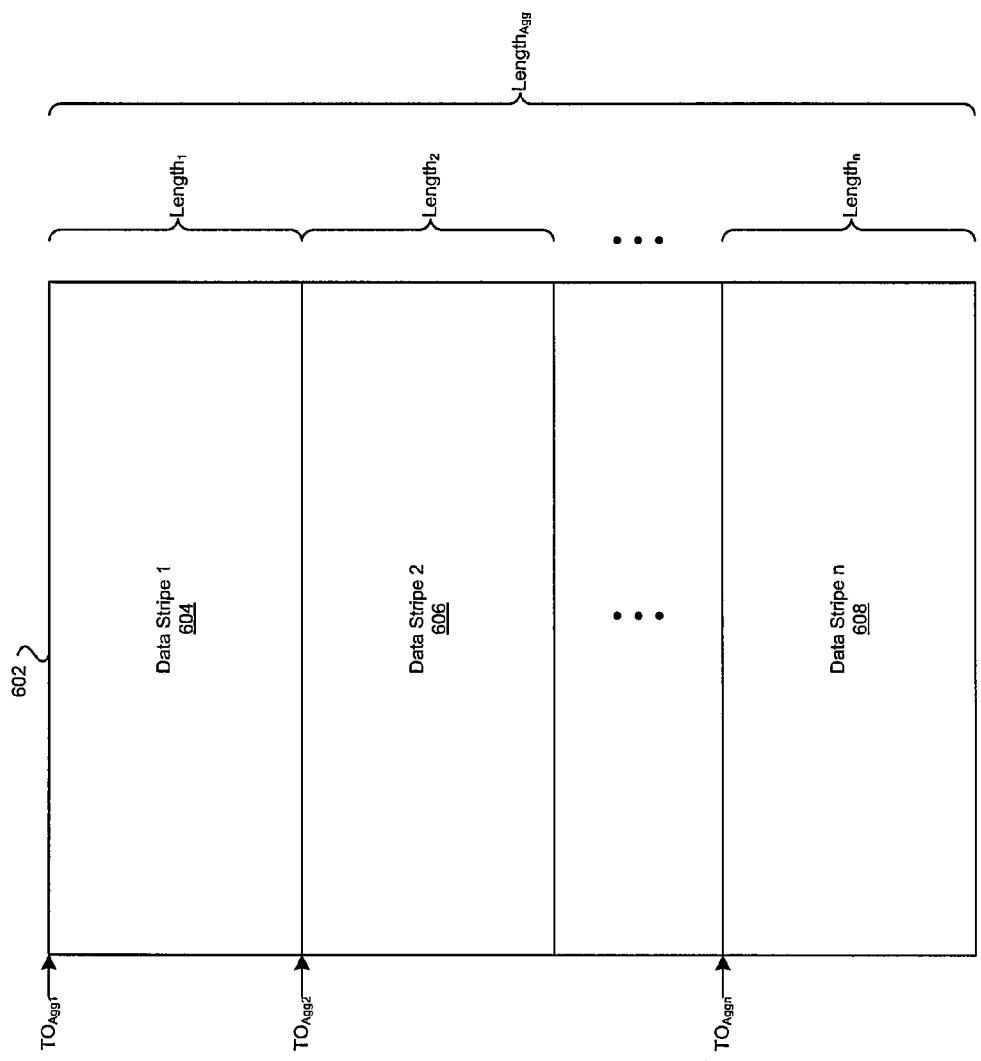
FIG. 6 is an illustration of an exemplary aggregated buffer in an RDMA-aware system, in accordance with an embodiment of the invention.

FIG. 6 is an illustration of an exemplary aggregated buffer in an RDMA-aware system, in accordance with an embodiment of the invention. Referring to FIG. 6, there is shown an aggregated buffer 602, a data stripe 1 604, a data stripe 2 606, and a data stripe n 608. The aggregated buffer 602 may represent logical memory resources, within a main server 108, that may be utilized to enable a client device 104 to retrieve and/or store data from and/or to an SAN device, for example. The aggregated buffer 602 may comprise a data capacity as indicated by the length, $Length_{Agg}$. A location within the aggregated buffer 602 may be indicated based on a buffer offset, $TO_{Agg}$. The aggregated buffer may also be utilized to reference physical memory resources within the client device 104, and/or within any of a plurality of auxiliary servers 110a, 110b, and/or 110c.

When the buffer offset $TO_{Agg1} \leq TO_{Agg} < (TO_{Agg1} + Length_{Agg})$, the buffer offset may reference physical memory resources within the client, where the length, $Length_{Agg}$, may refer to the data capacity of the buffer, within the client, where the buffer within the client may be referenced by the corresponding steering tag, $STag_{Snk}$.

When the buffer offset $TO_{Agg1} \leq TO_{Agg} < (TO_{Agg1} + Length_1)$, the buffer offset may reference physical memory resources within the auxiliary server 110a, where the length, $Length_1$, may refer to the data capacity of the buffer, within the auxiliary server 110a, where the buffer within the auxiliary server 110a may be referenced by the corresponding steering tag, $STag_1$. The auxiliary server 110a may be utilized for storage of the data stripe 1 604.

When the buffer offset $TO_{Agg2} \leq TO_{Agg} < (TO_{Agg2} + Length_2)$, the buffer offset may reference physical memory resources within the auxiliary server 110b, where the length, $Length_2$, may refer to the data capacity of the buffer, within the auxiliary server 110b, where the buffer within the auxiliary server 110b may be referenced by the corresponding steering tag $STag_2$. The auxiliary server 110b may be utilized for storage of the data stripe 2 606.

When the buffer offset $TO_{Aggn} \leq TO_{Agg} < (TO_{Aggn} + Length_n)$, the buffer offset may reference physical memory resources within the auxiliary server n, for example auxiliary server 110c, where the length, $Length_n$, may refer to the data capacity of the buffer, within the auxiliary server 110c, where the buffer within the auxiliary server n may be referenced by the corresponding steering tag $STag_n$. The auxiliary server n may be utilized for storage of the data stripe n 608.

Figure 7:
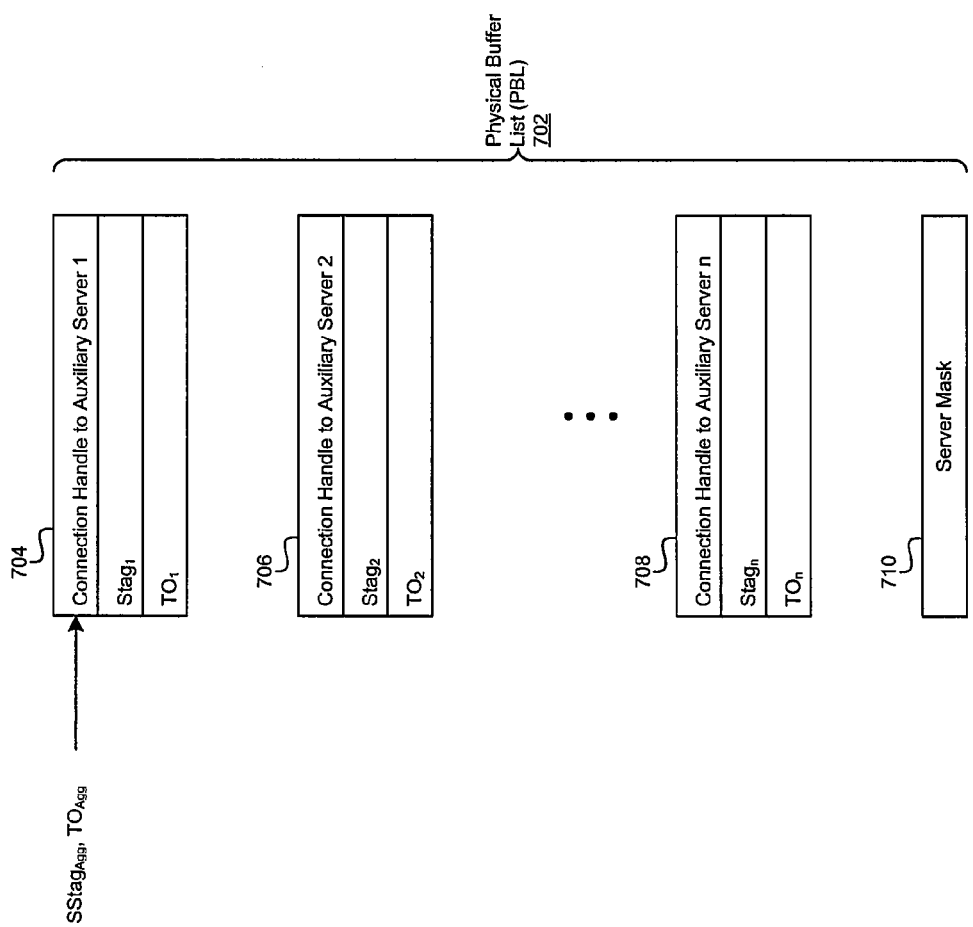
FIG. 7 is an illustration of an exemplary physical buffer list (PBL) in an RDMA-aware system, in accordance with an embodiment of the invention.

FIG. 7 is an illustration of an exemplary physical buffer list (PBL) in an RDMA-aware system, in accordance with an embodiment of the invention. Referring to FIG. 7, there is shown a PBL 702, a buffer 1 reference 704, a buffer 2 reference 706, a buffer n reference 708, and a server mask 710. The PBL 702 may utilize a steering tag, $\text{SSTag}_{Agg}$, and a buffer offset $\text{TO}_{Agg}$, as an index, for example. The index may be utilized to select one or more buffer references 704, 706, and/or 708 within the PBL 702. When the $\text{SSTag}_{Agg}$ is a splitting STag, the $\text{SSTag}_{Agg}$ may be utilized to generate a list of steering tags that may be utilized for data striping. When the $\text{SSTag}_{Agg}$ is a splicing STag, the $\text{SSTag}_{Agg}$ may be utilized to generate a list of steering tags that may be utilized for data splicing.

The buffer 1 reference 704 may comprise data that may enable the main server 108, to translate a reference to logical memory resources within the main server 108, to physical memory resources with the auxiliary server 110*a*. The buffer 1 reference 704 may comprise a steering tag, $\text{STag}_1$, which references physical memory resources within the auxiliary server 110*a*. The buffer 1 reference 704 may also comprise information, which may distinguish the $\text{STag}_1$ value from other buffers, which may also utilize the value. For example, the buffer 1 reference may comprise a connection handle to the auxiliary server 110*a*. The connection handle may comprise information that enables the main server 108 to communicate, via the network 102, with the auxiliary server 110*a*, for example via a TCP connection.

The buffer 2 reference 706 may comprise data that may enable the main server 108, to translate a reference to logical memory resources within the main server 108, to physical memory resources with the auxiliary server 110*b*. The buffer 2, referenced as 706, may comprise a steering tag, $\text{STag}_2$, which references physical memory resources within the auxiliary server 110*b*. The buffer 2, may also comprise information, which may distinguish the $\text{STag}_2$ value from other buffers, which may also utilize the value. For example, the buffer 2 may comprise a connection handle to the auxiliary server 110*b*.

The buffer n, referenced as 708, may comprise data that may enable the main server 108, to translate a reference to logical memory resources within the main server 108, to physical memory resources with the auxiliary server n, for example the auxiliary server 110*c*. The buffer n reference 708 may comprise a steering tag, $\text{STag}_n$, which references physical memory resources within the auxiliary server n. The buffer n reference 708 may also comprise information, which may distinguish the $\text{STag}_n$ value from other buffers, which may also utilize the value. For example, the buffer n reference may comprise a connection handle to the auxiliary server n.

The server mask 710 may comprise a binary data word, which may be utilized by the main server 108 to determine which auxiliary servers in an auxiliary server group contribute buffers within a given aggregated buffer. Each bit in the server mask may correspond to one of a plurality of auxiliary servers. For each bit in the server mask 710 for which the binary value is 1, the corresponding auxiliary server may contribute buffers to the given aggregated buffer. For each bit in the server mask 710 for which the binary value is 0, the corresponding auxiliary server may not contribute buffers to the given aggregated buffer.

Various embodiments of the invention may be practiced in RDMA-aware systems, which comprise two or more main servers. Various embodiments of the invention may be utilized in connection with other RDMA messages, for example, with DDP segments where the opcode is "send with solicited event and invalidate message." Various embodiments of the invention may be practiced in session-oriented applications, in which a connection between communicating entities in an RDMA-aware transaction is established and maintained after an individual transaction has been completed, or in transaction-oriented applications, in which a connection may be established to enable an RDMA-aware transaction, where the connection is terminated after the RDMA-aware transaction has been completed.

Aspects of the system may comprise at least one processor 220 that enables reception of at least a portion of a data stripe within a direct data placement (DDP) segment. The one or more processors 220 may enable transfer of a modified version of the received portion of the data stripe to a client 104 without waiting to receive a subsequent portion or more of a data stripe destined for the client 104. The modified version of the received portion or more of the data stripe may comprise a destination location for storing the modified version of the portion or more of the data stripe within the client 104. The client 104 may store the modified version of the at least a portion of the data stripe based on the destination location.

The received DDP segment may comprise a splicing steering tag (STag), and a signature field that identifies the STag as a splicing STag. The one or more processors 220 may enable determination of the destination location for the modified version of the received at least a portion of the data stripe based on the splicing STag, a data stripe offset field, a physical buffer list (PBL), and/or a server mask field. The one or more processors 220 may enable generation of an aggregated offset field based on the destination location. The transferred modified version of the received at least a portion of the data stripe may comprise the aggregated offset field.

The one or more processors 220 may enable modification of a value for a last (L) flag bit in the received DDP segment when generating a modified DDP segment when the received DDP segment is a last of a plurality of received DDP segments and a transferred modified DDP segment is not a last of a plurality of transferred DDP segments. A value for an L flag bit in the received DDP segment may be equal to a corresponding value for an L bit in a transferred modified DDP segment when the received DDP segment is a last of a plurality of received DDP segments and the transferred modified DDP segment is a last of a plurality of transferred DDP segments. A value for an L flag bit in the received DDP segment may be equal to a corresponding value for an L bit in a transferred modified DDP segment when the received DDP segment is not a last of a plurality of received DDP segments and the transferred modified DDP segment is not a last of a plurality of transferred DDP segments.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for handling data in a communications system, the method comprising:
performing by at least one processor in a storage server that is utilized for storing data in a plurality of external auxiliary storage devices accessed via said storage server:
receiving at least a portion of a data stripe, during retrieval of said data stripe from at least one of said plurality of external auxiliary storage devices, within a direct data placement (DDP) segment;
translating a steering tag field representing a logical memory location within the storage server generating a steering tag field representing a physical memory location within a client, the steering tag field being provided from the at least a portion of the data stripe;
translating an offset field representing the logical memory location within the storage server generating an offset field representing the physical memory location within the client, the offset field being provided from the at least a portion of the data stripe; and
transferring a modified version of said received at least a portion of said data stripe to the client without waiting to receive a subsequent at least a portion of a data stripe destined for said client, wherein said modified version of said received at least a portion of said data stripe comprises a destination location for storing said modified version of said at least a portion of said data stripe within said client, wherein the destination location is identified by the steering tag field and the offset field representing the physical memory location within the client.

2. The method according to claim 1, wherein said steering tag field of the received DDP segment comprises a splicing steering tag (STag).

3. The method according to claim 2, wherein said received DDP segment comprises a signature field that identifies said splicing STag.

4. The method according to claim 3, wherein the offset field of the received DDP segment comprises a data stripe offset field, the method further comprising determining said destination location for said modified version of said received at least a portion of said data stripe based on at least one of: said splicing STag, the data stripe offset field, a physical buffer list (PBL), and a server mask field.

5. The method according to claim 4, comprising generating an aggregated offset field based on said destination location.

6. The method according to claim 5, wherein said transferred modified version of said received at least a portion of said data stripe comprises said aggregated offset field.

7. The method according to claim 1, comprising modifying a value for a last (L) flag bit in said received DDP segment when generating a modified DDP segment when said received DDP segment is a last of a plurality of received DDP segments and a transferred said modified DDP segment is not a last of a plurality of transferred DDP segments.

8. The method according to claim 1, wherein a value for an L flag bit in said received DDP segment is equal to a corresponding value for an L bit in a transferred modified DDP segment when said received DDP segment is a last of a plurality of received DDP segments and said transferred modified DDP segment is a last of a plurality of transferred DDP segments.

9. The method according to claim 1, wherein a value for an L flag bit in said received DDP segment is equal to a corresponding value for an L bit in a transferred modified DDP segment when said received DDP segment is not a last of a plurality of received DDP segments and said transferred modified DDP segment is not a last of a plurality of transferred DDP segments.

10. The method according to claim 1, wherein said client stores said modified version of said at least a portion of said data stripe based on said destination location.

11. A machine-readable storage having stored thereon, a computer program having at least one code section for handling data in a communications system, the at least one code section being executable by a machine for causing the machine to perform steps comprising:
receiving at a storage server that is utilized for storing data in a plurality of external auxiliary storage devices accessed via said storage server, at least a portion of a data stripe, during retrieval of said data stripe from at least one of said plurality of external auxiliary storage devices, within a direct data placement (DDP) segment;
translating a steering tag field representing a logical memory location within the storage server generating a steering tag field representing a physical memory location within a client, the steering tag field being provided from the at least a portion of the data stripe;
translating an offset field representing the logical memory location within the storage server generating an offset field representing the physical memory location within the client, the offset field being provided from the at least a portion of the data stripe; and
transferring a modified version of said received at least a portion of said data stripe to the client without waiting to receive a subsequent at least a portion of a data stripe destined for said client, wherein said modified version of said received at least a portion of said data stripe comprises a destination location for storing said modified version of said at least a portion of said data stripe within said client, wherein the destination location is identified by the steering tag field and the offset field representing the physical memory location within the client.

12. The machine-readable storage according to claim 11, wherein said steering tag field of the received DDP segment comprises a splicing steering tag (STag).

13. The machine-readable storage according to claim 12, wherein said received DDP segment comprises a signature field that identifies said splicing STag.

14. The machine-readable storage according to claim 13, wherein the offset field of the received DDP segment comprises a data stripe offset field and said at least one code section comprises code for determining said destination location for said modified version of said received at least a portion of said data stripe based on at least one of: said splicing STag, the data stripe offset field, a physical buffer list (PBL), and a server mask field.

15. The machine-readable storage according to claim 14, wherein said at least one code section comprises code for generating an aggregated offset field based on said destination location.

16. The machine-readable storage according to claim 15, wherein said transferred modified version of said received at least a portion of said data stripe comprises said aggregated offset field.

17. The machine-readable storage according to claim 11, wherein said at least one code section comprises code for modifying a value for a last (L) flag bit in said received DDP segment when generating a modified DDP segment when said received DDP segment is a last of a plurality of received DDP segments and a transferred said modified DDP segment is not a last of a plurality of transferred DDP segments.

18. The machine-readable storage according to claim 11, wherein a value for an L flag bit in said received DDP segment is equal to a corresponding value for an L bit in a transferred modified DDP segment when said received DDP segment is a last of a plurality of received DDP segments and said transferred modified DDP segment is a last of a plurality of transferred DDP segments.

19. The machine-readable storage according to claim 11, wherein a value for an L flag bit in said received DDP segment is equal to a corresponding value for an L bit in a transferred modified DDP segment when said received DDP segment is not a last of a plurality of received DDP segments and said transferred modified DDP segment is not a last of a plurality of transferred DDP segments.

20. The machine-readable storage according to claim 11, wherein said client stores said modified version of said at least a portion of said data stripe based on said destination location.

21. A system for handling data in a communications system, the system comprising:
  at least one processor for use in a storage server that is utilized for storage data in a plurality of external auxiliary storage devices accessed via said storage server, said at least one processor being operable to:
    receive, during retrieval of a data stripe from at least one of said plurality of external auxiliary storage devices, at least a portion of said data stripe within a direct data placement (DDP) segment;
    translate a steering tag field representing a logical memory location within the storage server generating a steering tag field representing a physical memory location within a client, the steering tag field being provided from the at least a portion of the data stripe;
    translate an offset field representing the logical memory location within the storage server generating an offset field representing the physical memory location within the client, the offset field being provided from the at least a portion of the data stripe; and
    transfer a modified version of said received at least a portion of said data stripe to client without waiting to receive a subsequent at least a portion of a data stripe destined for said client,
    wherein said modified version of said received at least a portion of said data stripe comprises a destination location for storing said modified version of said at least a portion of said data stripe within said client,
    wherein the destination location is identified by the steering tag field and the offset field representing the physical memory location within the client.

22. The system according to claim 21, wherein said steering tag field of the received DDP segment comprises a splicing steering tag (STag).

23. The system according to claim 22, wherein said received DDP segment comprises a signature field that identifies said splicing STag.

24. The system according to claim 23, wherein the offset field of the received DDP segment comprises a data stripe offset field and said at least one processor enables determination of said destination location for said modified version of said received at least a portion of said data stripe based on at least one of: said splicing STag, the data stripe offset field, a physical buffer list (PBL), and a server mask field.

25. The system according to claim 24, wherein said at least one processor enables generation of an aggregated offset field based on said destination location.

26. The system according to claim 25, wherein said transferred modified version of said received at least a portion of said data stripe comprises said aggregated offset field.

27. The system according to claim 21, wherein said at least one processor enables modification of a value for a last (L) flag bit in said received DDP segment when generating a modified DDP segment when said received DDP segment is a last of a plurality of received DDP segments and a transferred said modified DDP segment is not a last of a plurality of transferred DDP segments.

28. The system according to claim 21, wherein a value for an L flag bit in said received DDP segment is equal to a corresponding value for an L bit in a transferred modified DDP segment when said received DDP segment is a last of a plurality of received DDP segments and said transferred modified DDP segment is a last of a plurality of transferred DDP segments.

29. The system according to claim 21, wherein a value for an L flag bit in said received DDP segment is equal to a corresponding value for an L bit in a transferred modified DDP segment when said received DDP segment is not a last of a plurality of received DDP segments and said transferred modified DDP segment is not a last of a plurality of transferred DDP segments.

30. The system according to claim 21, wherein said client stores said modified version of said at least a portion of said data stripe based on said destination location.

\* \* \* \* \*